United States Patent [19]
Watanabe

[11] Patent Number: 5,270,864
[45] Date of Patent: Dec. 14, 1993

[54] ZOOM LENS SYSTEM FOR USE IN COPYING APPARATUS

[75] Inventor: Sanae Watanabe, Storrs, Conn.

[73] Assignee: Minolta Camera Kabushiki Kaisha, Japan

[21] Appl. No.: 875,988

[22] Filed: Apr. 29, 1992

[30] Foreign Application Priority Data

Apr. 30, 1991 [JP] Japan .................. 3-124466
Apr. 30, 1991 [JP] Japan .................. 3-124468

[51] Int. Cl.⁵ .................... G02B 15/14; G02B 9/12
[52] U.S. Cl. ........................ 359/679; 359/685; 359/689
[58] Field of Search ........... 359/676, 685, 770, 784, 359/683, 689, 679, 686

[56] References Cited

U.S. PATENT DOCUMENTS

| | | | |
|---|---|---|---|
| 4,707,082 | 11/1987 | Itoh | 359/679 |
| 4,735,496 | 4/1988 | Arai | 359/679 |
| 4,805,999 | 2/1989 | Ueda et al. | 359/679 |
| 4,813,773 | 3/1989 | Minefuji | 359/679 |
| 5,039,212 | 8/1991 | Kanoshima | 359/679 |

FOREIGN PATENT DOCUMENTS 3-265811  11/1991  Japan ............... 359/676

*Primary Examiner*—Bruce Y. Arnold
*Assistant Examiner*—David R. Parsons
*Attorney, Agent, or Firm*—Price, Gess & Ubell

[57] ABSTRACT

A zoom lens system includes from one side to the other side: a first lens unit of a negative power having a negative lens element concave to the one side; a second lens unit of a positive power having a positive meniscus lens element convex to the one side, a biconcave lens element whose one side surface has a larger radius of curvature and a biconvex lens element; and a third lens unit of a negative power having a negative meniscus lens element concave to the other side. In order to perform zooming, the distance between the first lens unit and the second lens unit and the distance between the second lens unit and the third lens unit are varied, and the entire zoom lens system is moved along the optical axis.

13 Claims, 33 Drawing Sheets

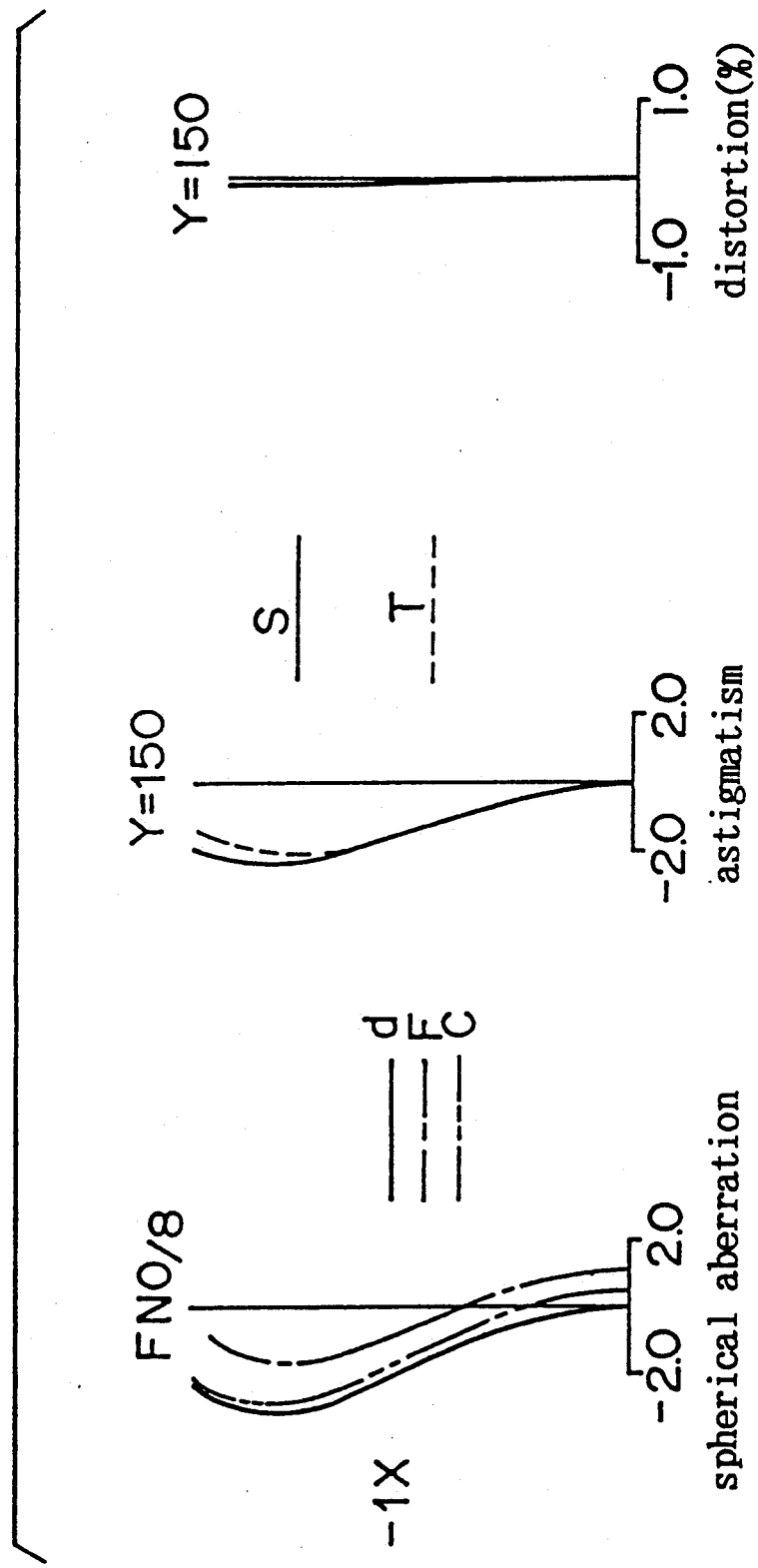

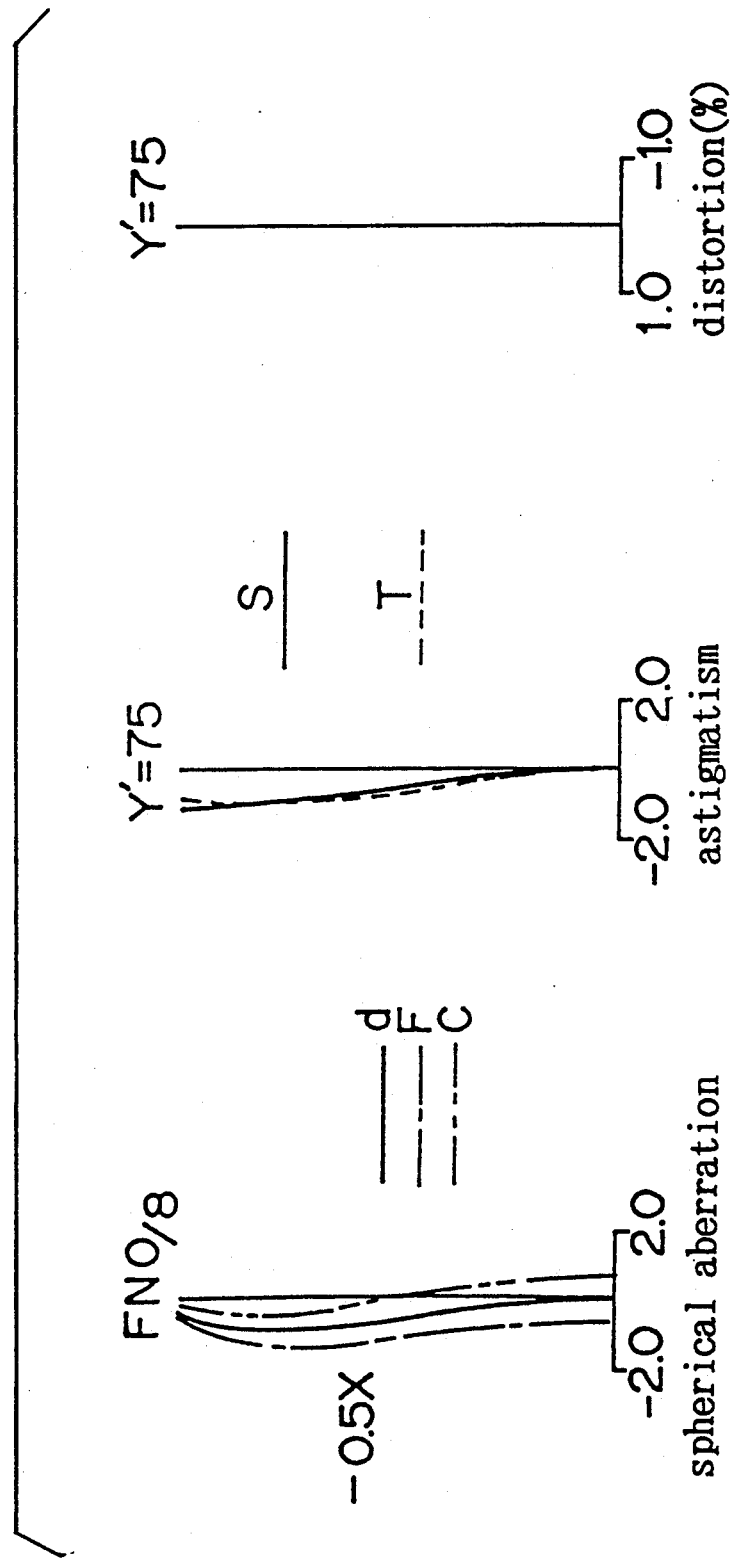

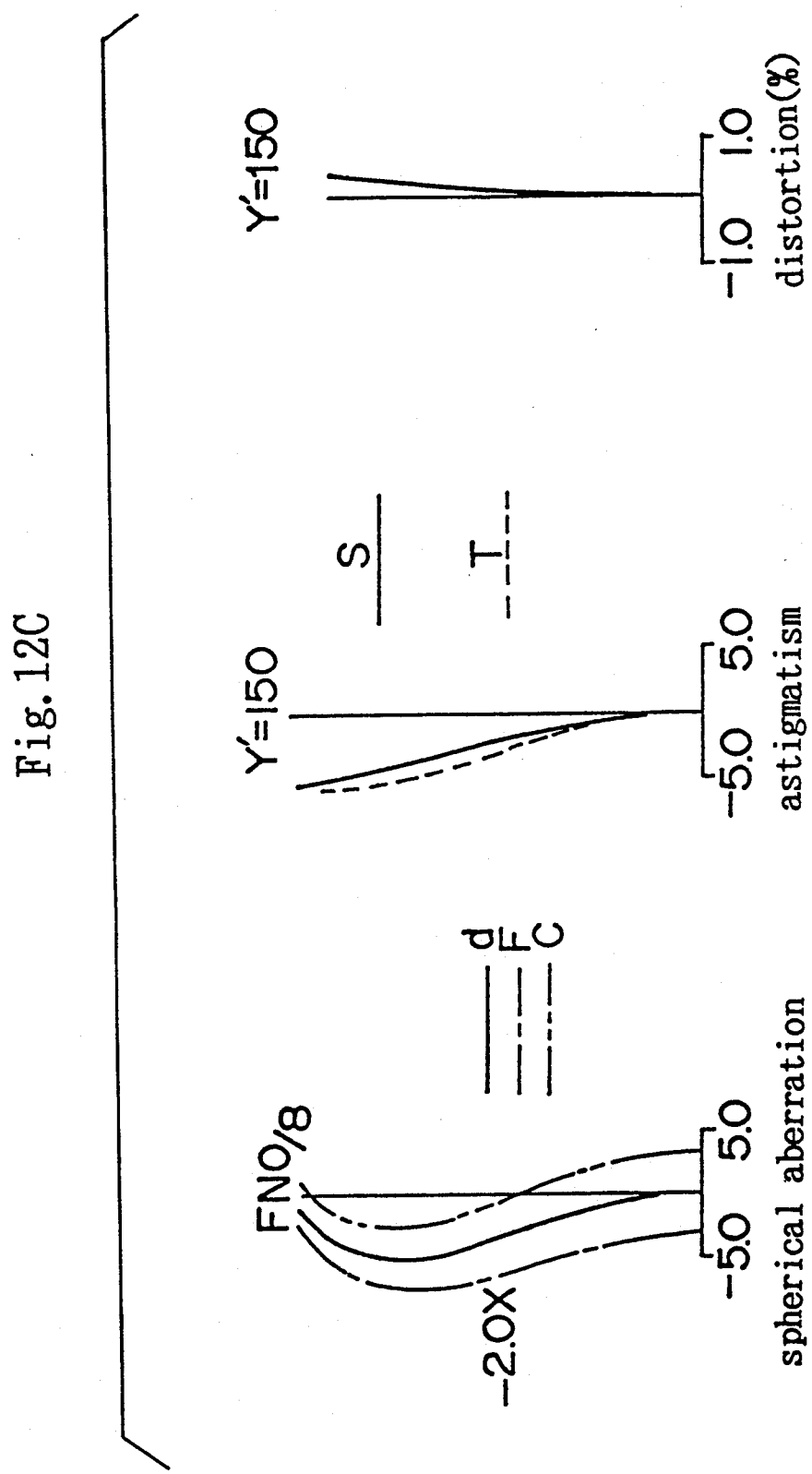

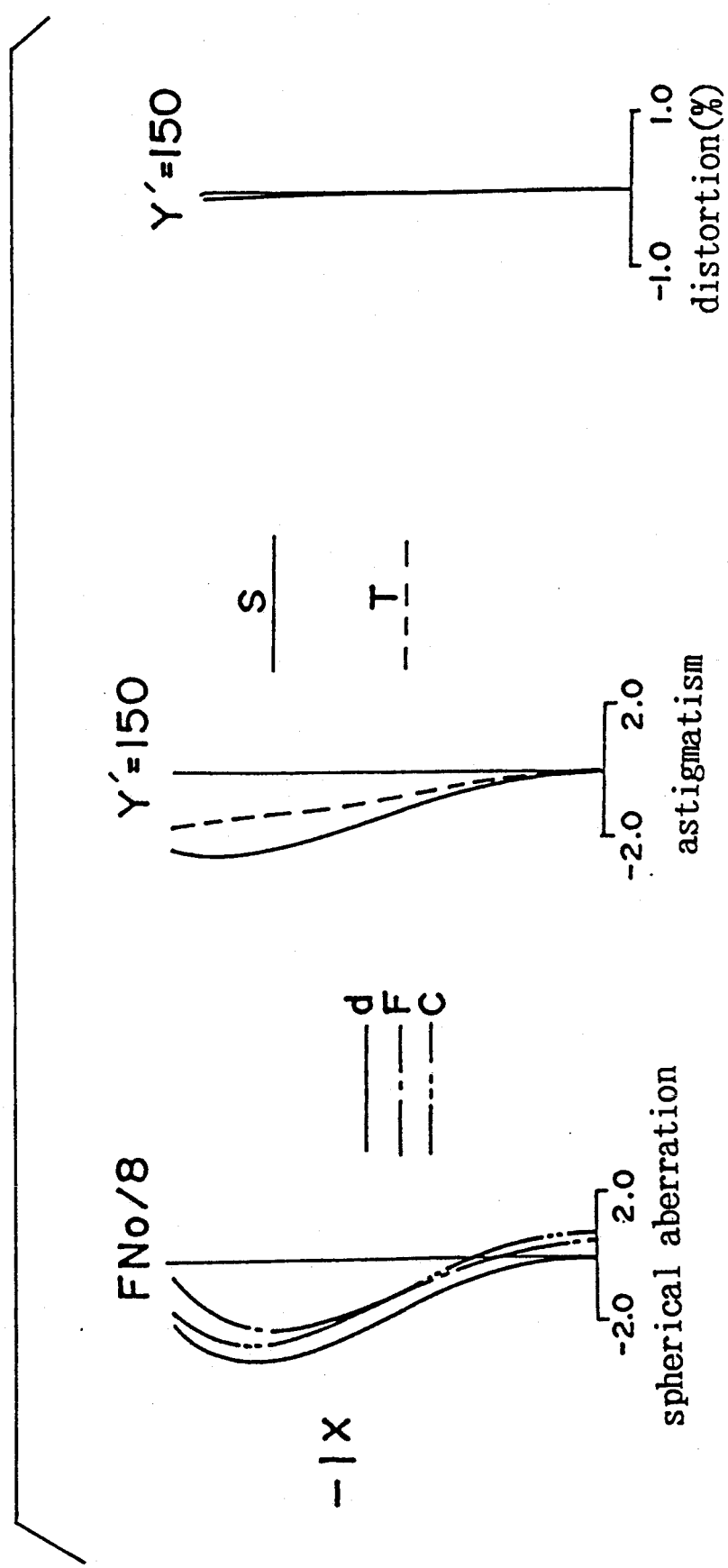

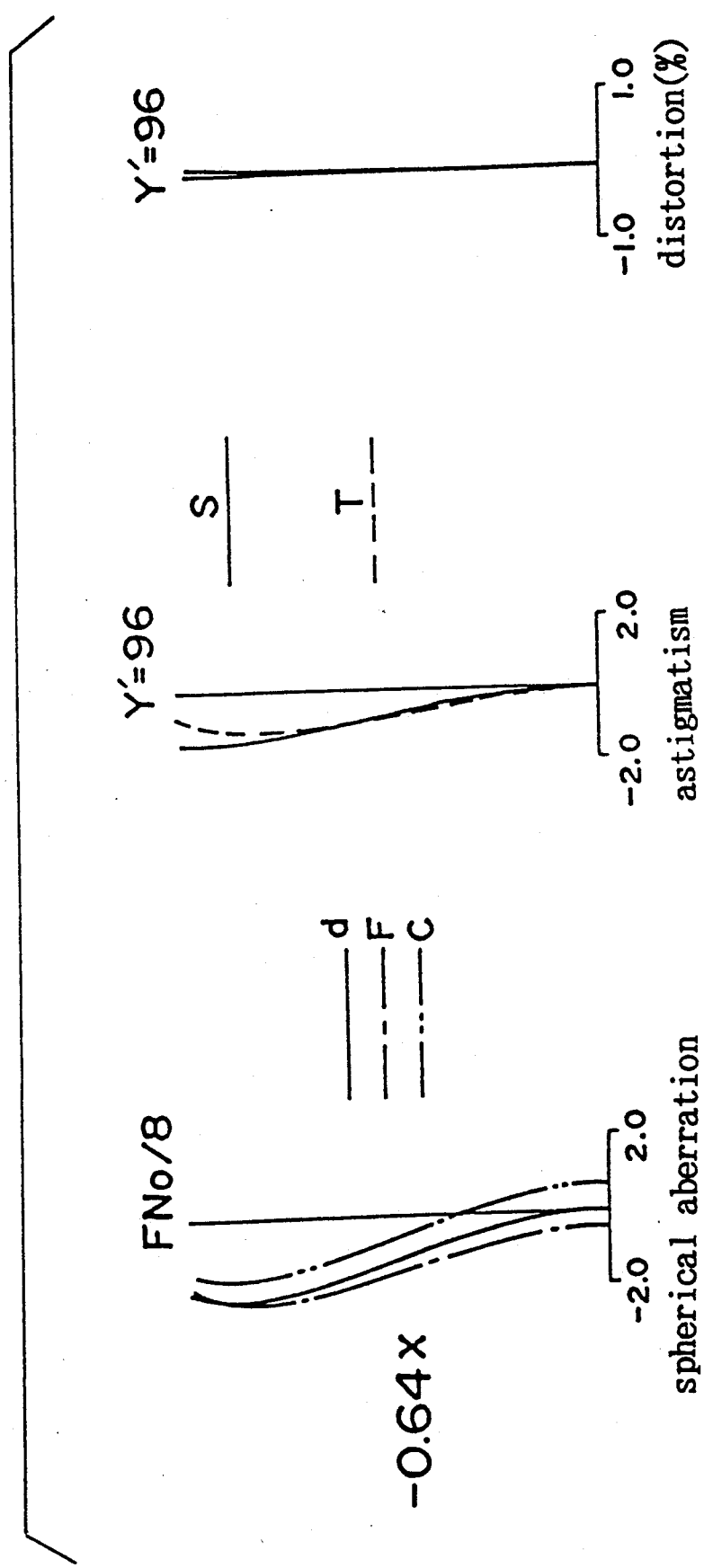

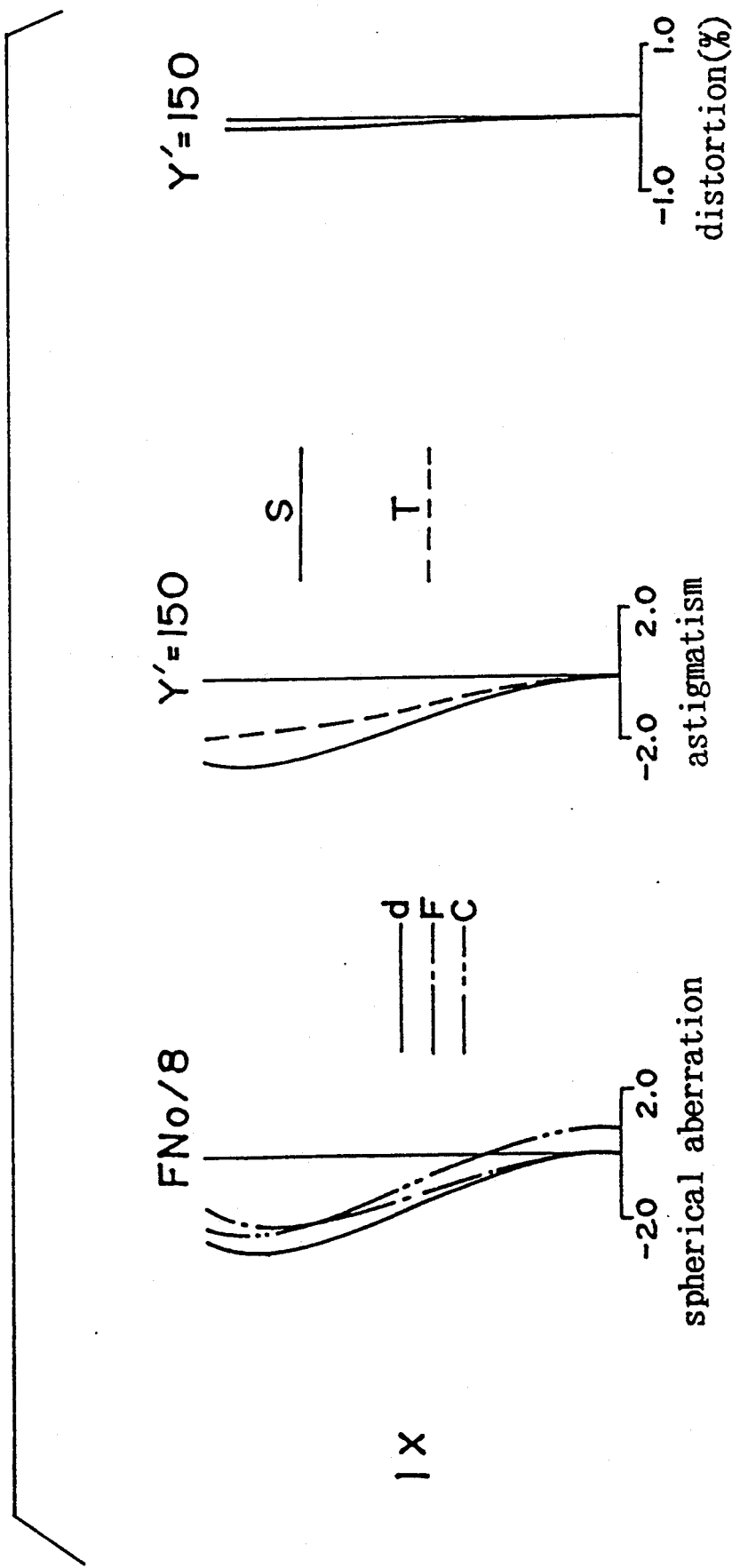

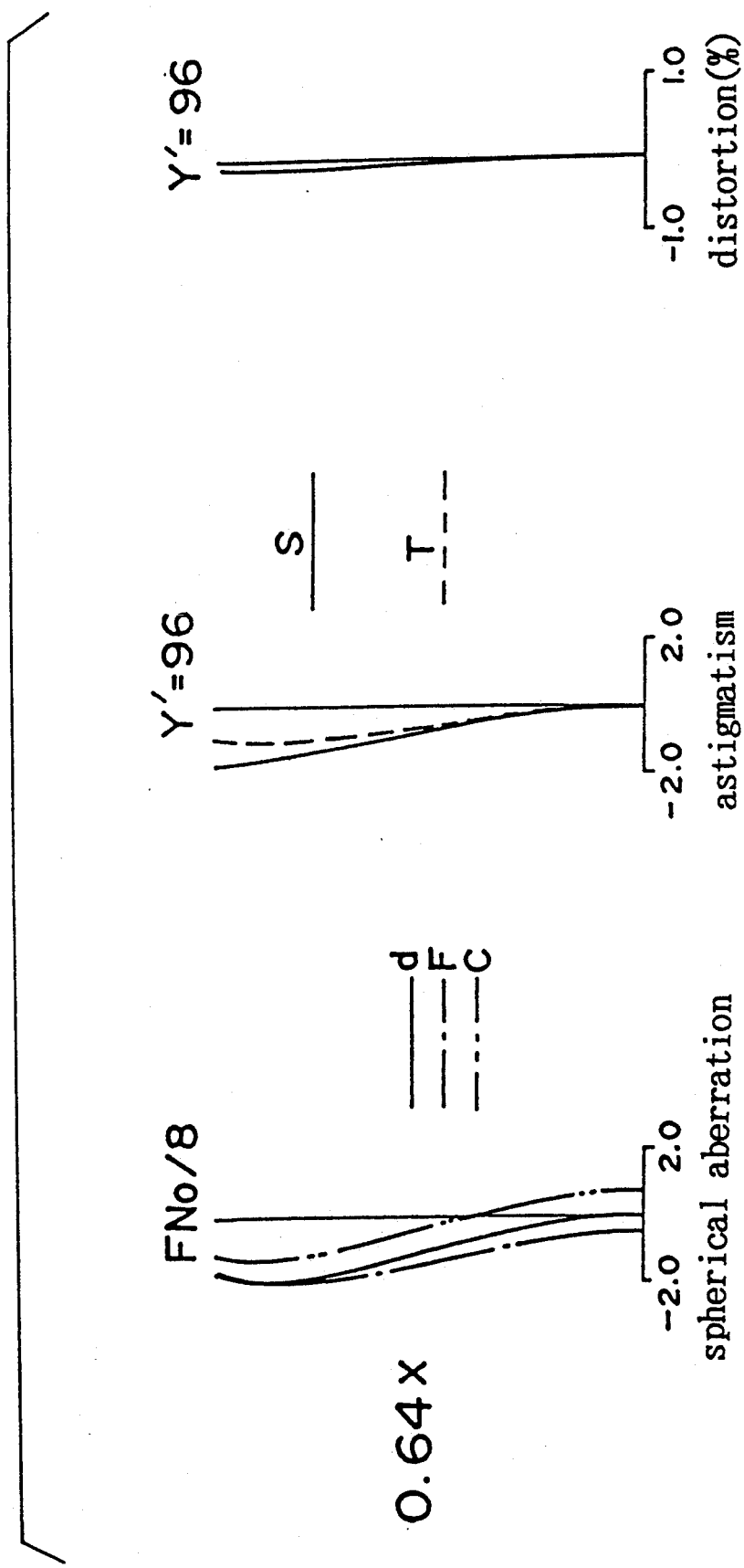

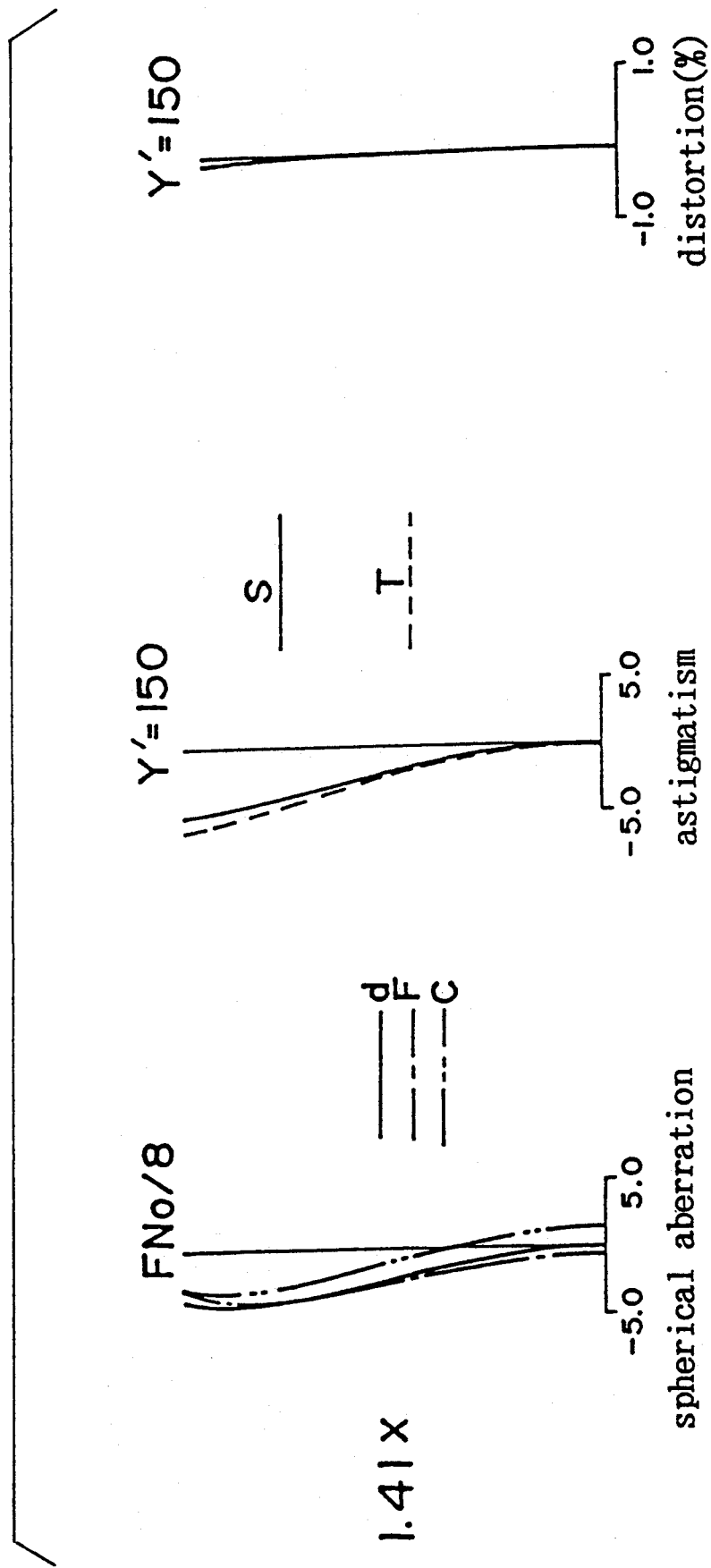

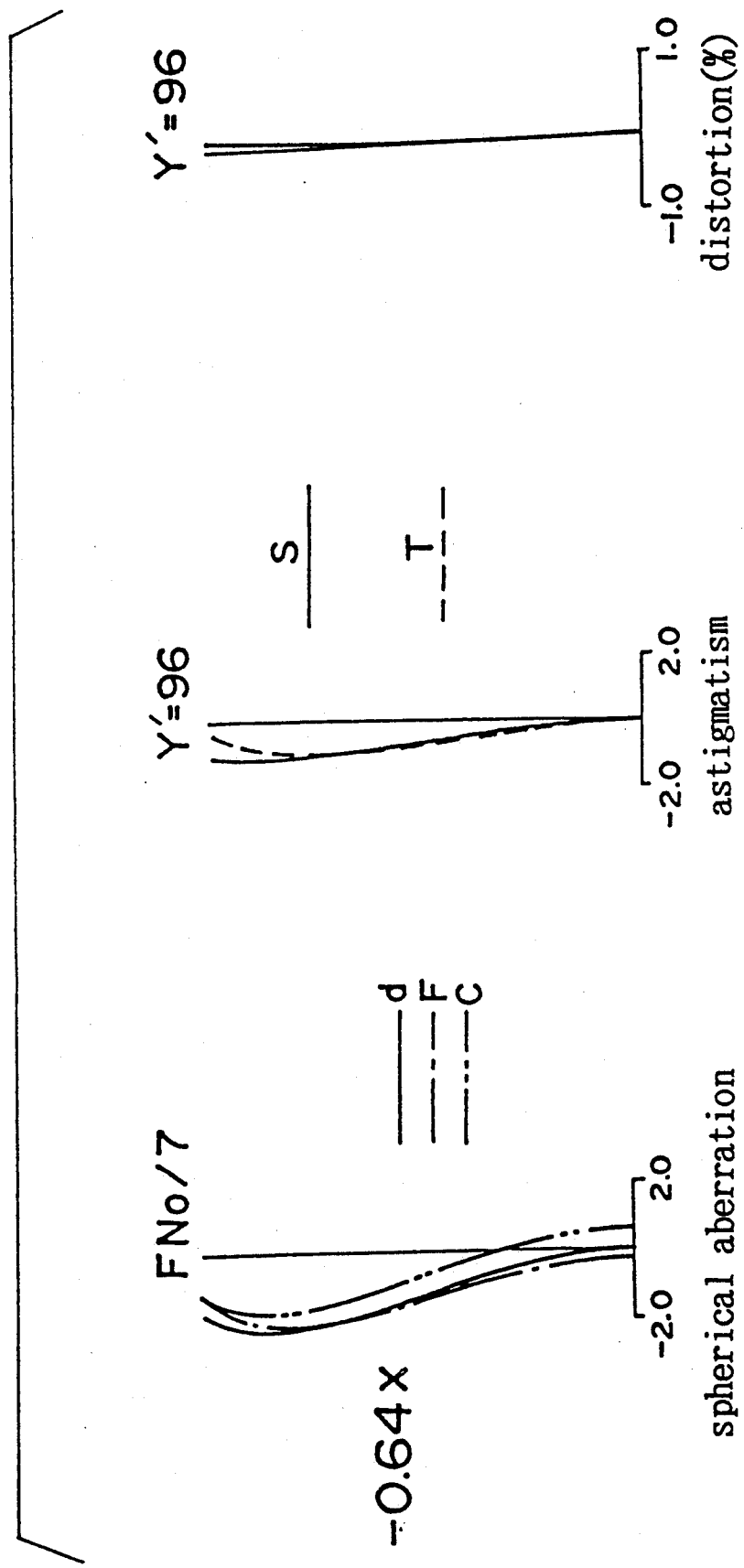

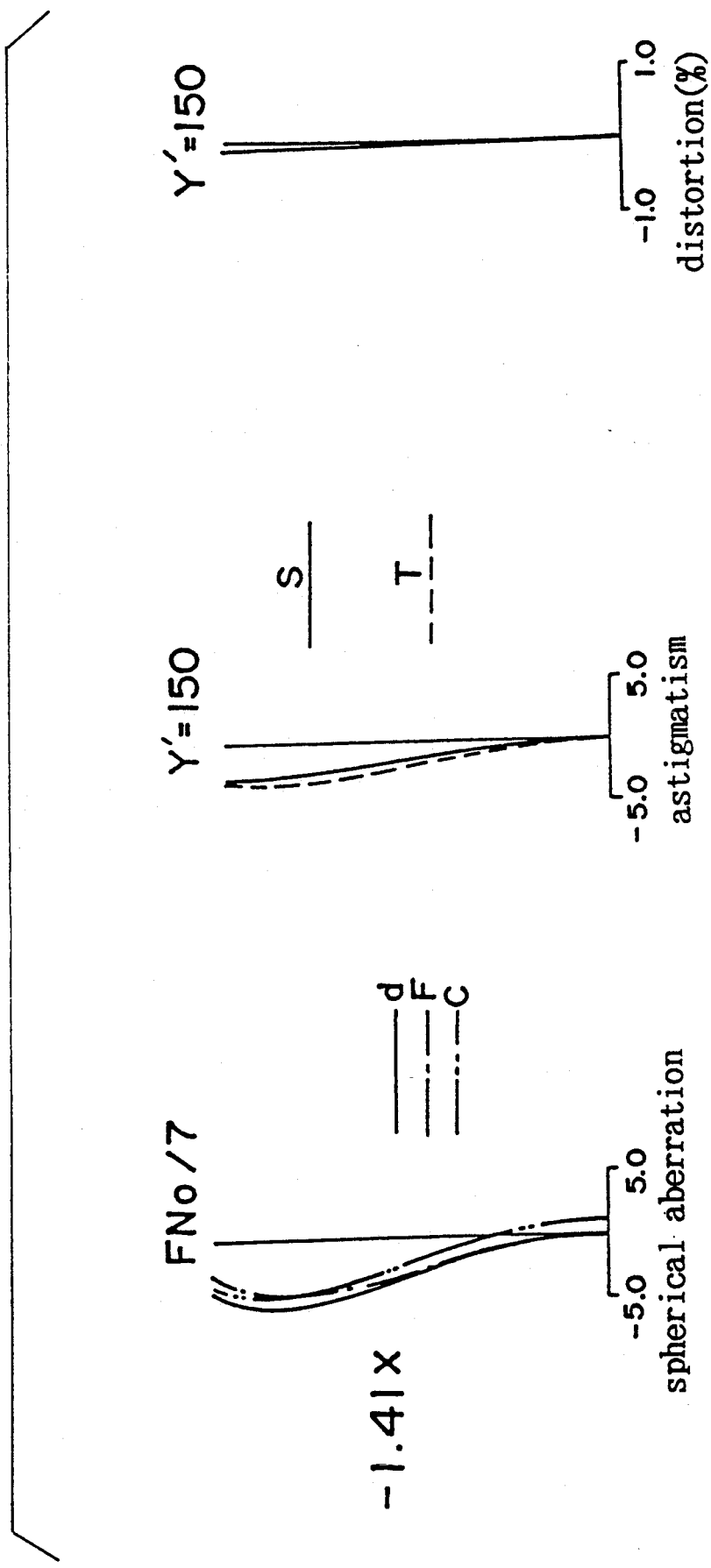

ZOOM LENS SYSTEM FOR USE IN COPYING APPARATUS

BACKGROUND OF THE INVENTION

1. Field of the Invention

The present invention relates to a zoom lens system, and more particularly, to a zoom lens system for use in a copying apparatus where zooming is performed at a constant conjugate distance.

2. Description of the Prior Art

In a conventionally-used copying apparatus, in order to vary the magnification, the conjugate distance is varied by moving a mirror as a projecting lens moves. For such a copying apparatus, since the mirror is moved in order to vary the conjugate distance, a mechanism for moving the mirror is required. For this reason, the copying apparatus is disadvantageous in reducing size and cost.

In resent years, zoom lens systems have been suggested to vary the magnification in a copying apparatus.

U.S. Pat. No. 4,805,999 discloses a zoom lens system for use in a copying apparatus including eight lens elements and having an F number of 8 to 6.3, a half angle of view of 19.2° and a magnification of 0.5× to 2.0×. This zoom lens, although having a wide zoom range, has a disadvantage that its cost is high and that it is large in size, since it has a large number of lens elements.

U.S. Pat. No. 4,813,773 discloses a zoom lens system for use in a copying apparatus including five or six lens elements and having an F number of 7, a half angle of view of 17° to 21° and a magnification of 0.64× to 1.42×. This zoom lens system has a disadvantage that it is long in total length and large in size.

SUMMARY OF THE INVENTION

An object of the present invention is to provide a compact zoom lens system including a small number of lens elements.

Another object of the present invention is to provide a zoom lens system having a wide zoom range and including a small number of lens elements.

Still another object of the present invention is to provide a zoom lens system where various aberrations are excellently corrected in spite of its small number of lens elements.

BRIEF DESCRIPTION OF THE DRAWINGS

These and other objects and features of this invention will become clear from the following description taken in conjunction with the preferred embodiments with reference to the accompanied drawings in which:

FIGS. 10A, 10B and 10C to 18A, 18B and 18C are graphic representations of the aberration curves of the first to ninth embodiments of the present invention;

DESCRIPTION OF THE PREFERRED EMBODIMENTS

Embodiments of the present invention will hereinafter be described with reference to the drawings.

Figure 1:
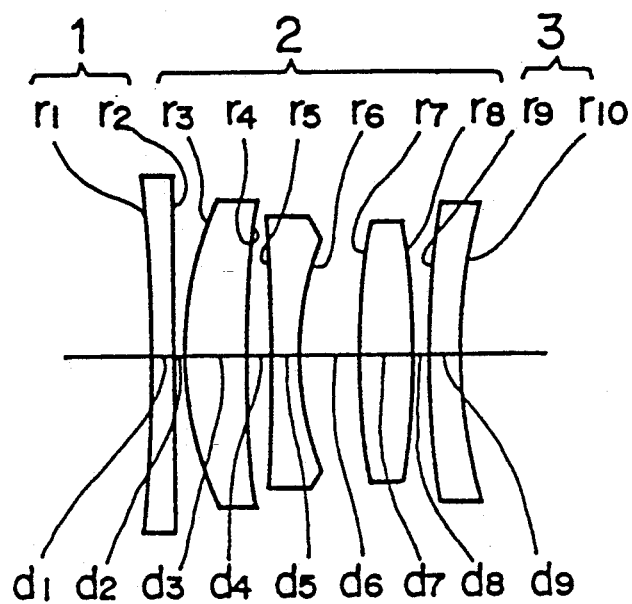
FIGS. 1 to 9 are cross-sectional views showing the lens arrangements of a first to ninth embodiments of the present invention.
Figure 2:
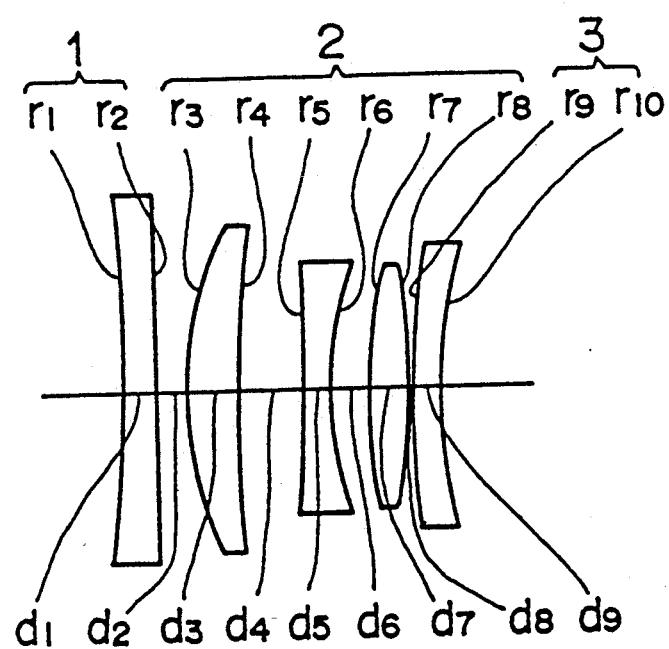
Figure 3:
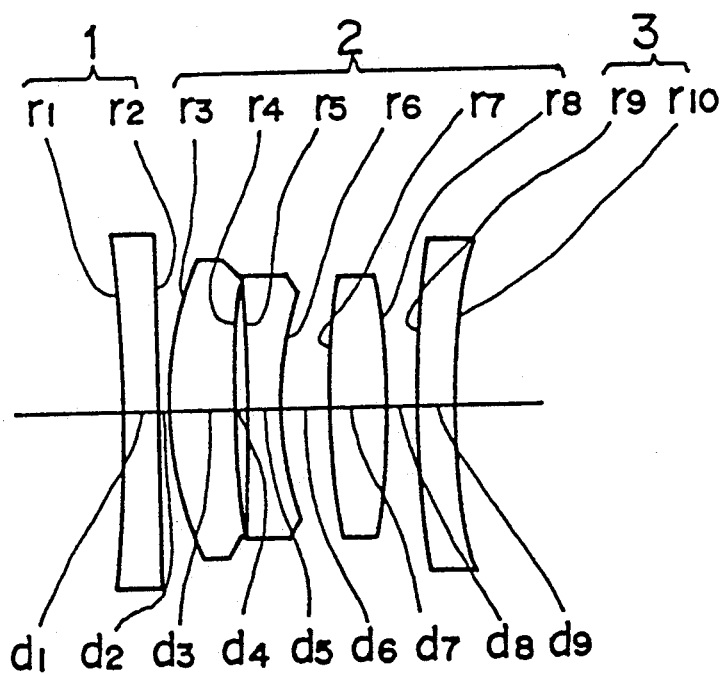
Figure 4:
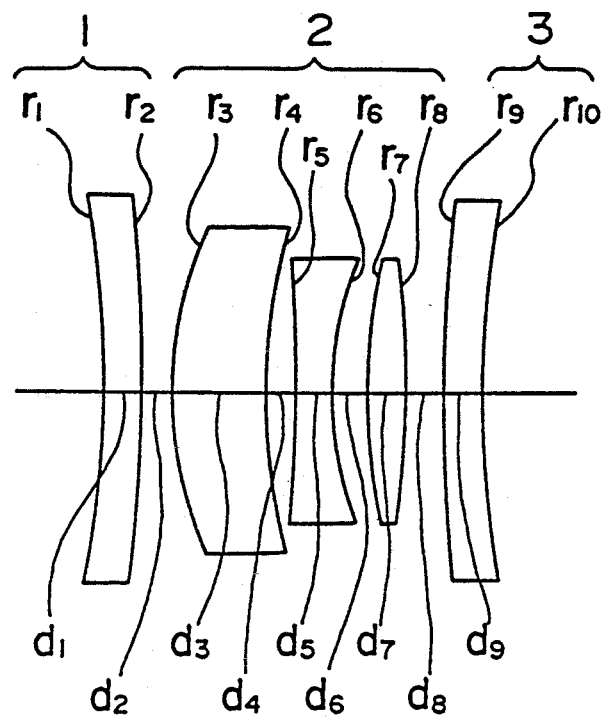
Figure 5:
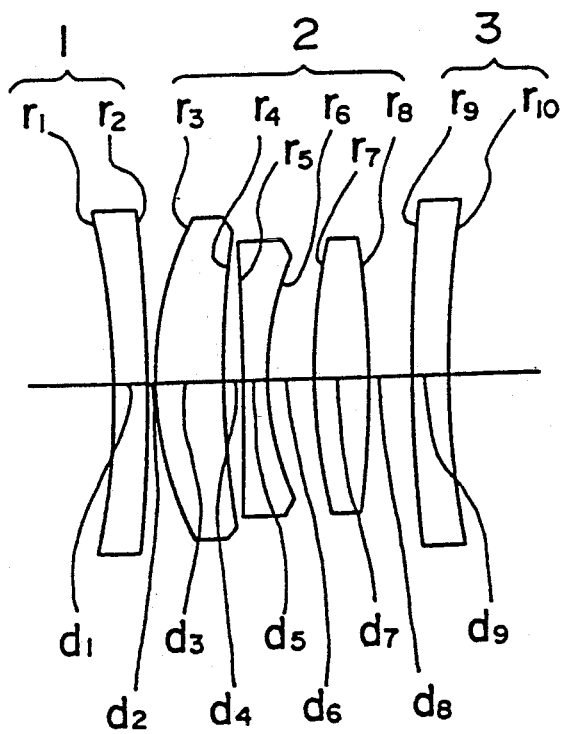
Figure 6:
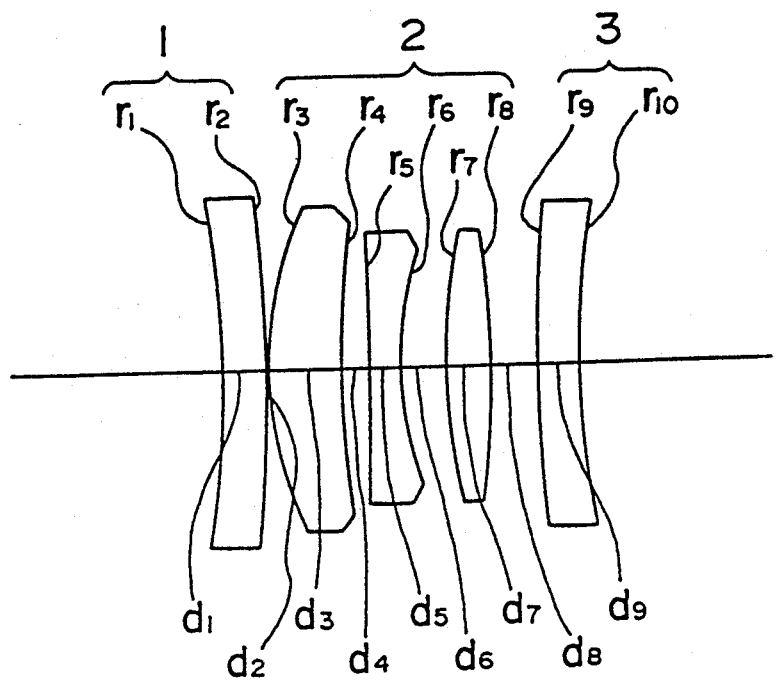
Figure 7:
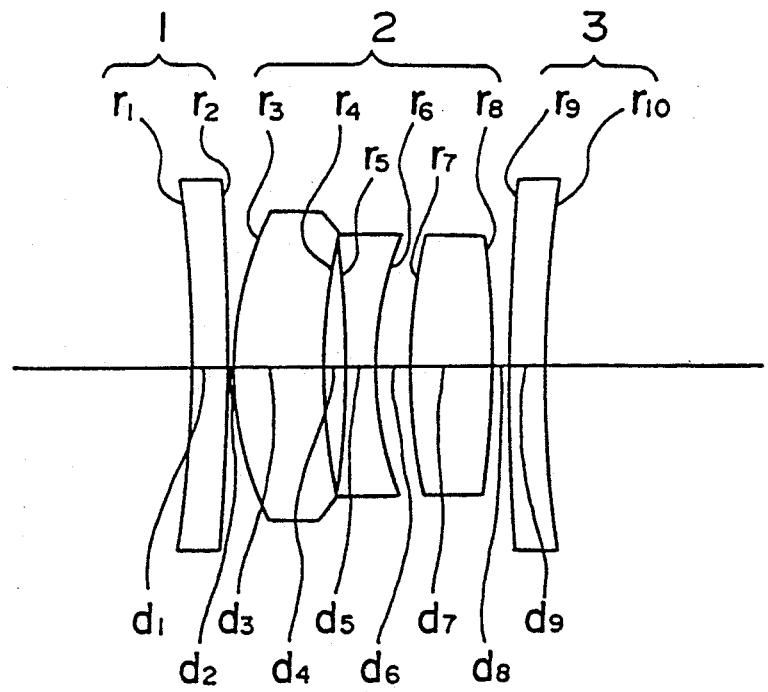
Figure 8:
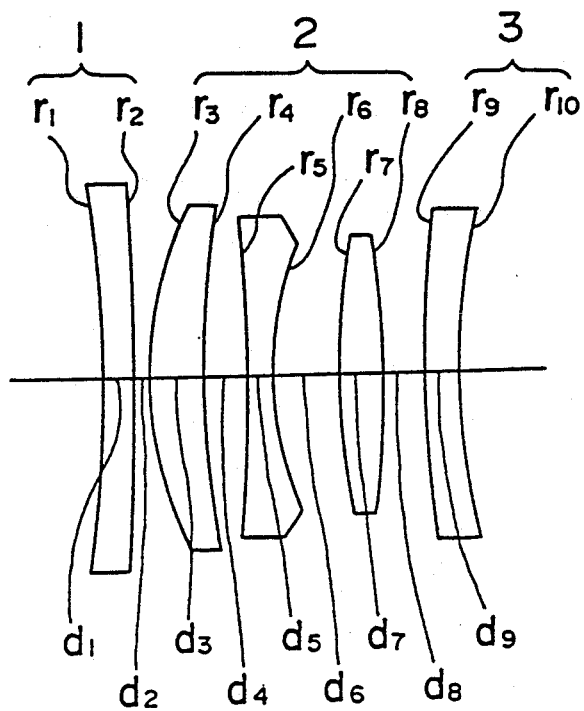
Figure 9:
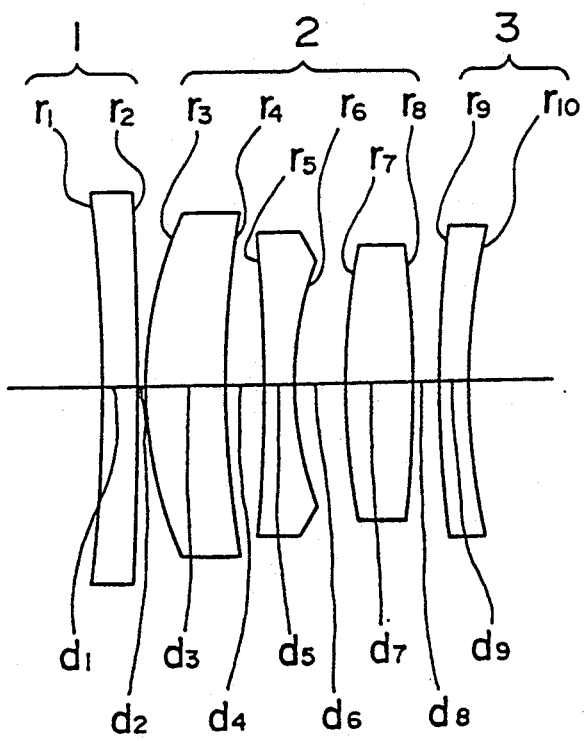

FIGS. 1 to 3 are cross-sectional views showing lens arrangements of a first to third embodiments of the present invention. The first to third embodiments comprise from the object side: a first lens unit 1 of a negative power (the first lens unit 1) including a first lens element which is a negative lens element concave to the object side; a second lens unit 2 of a positive power (the second lens unit 2) including a second lens element which is a positive meniscus lens element convex to the object side, a third lens element which is a biconcave lens element whose object side surface has a larger radius of curvature and a fourth lens element which is a biconvex lens element; and a third lens unit 3 of a negative power (the third lens unit 3) including a fifth lens element which is a negative meniscus lens element concave to the image side. By varying a distance $d_2$ between the first lens unit 1 and the second lens unit 2 and a distance $d_8$ between the second lens unit 2 and the third lens unit 3 as well as by moving the entire lens system, magnification is varied while the conjugate distance is maintained constant.

Figure 19:
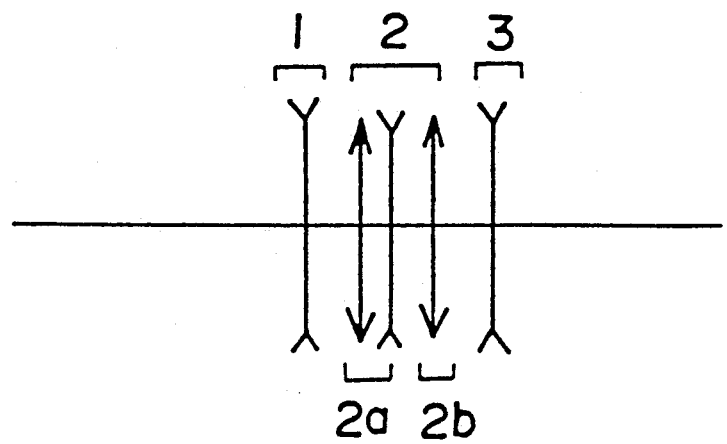
FIG. 19 is a view of a lens arrangement showing a zooming condition of the embodiments of the present invention.

In these embodiments, the first lens unit 1 and the third lens unit 3 serve as zoom units. FIG. 19 shows a lens arrangement thereof at unity magnification. In FIG. 19, the second lens unit 2 is shown divided into a front component 2a and a rear component 2b since the distance between the third lens element and the fourth lens element slightly varies.

Figure 20:
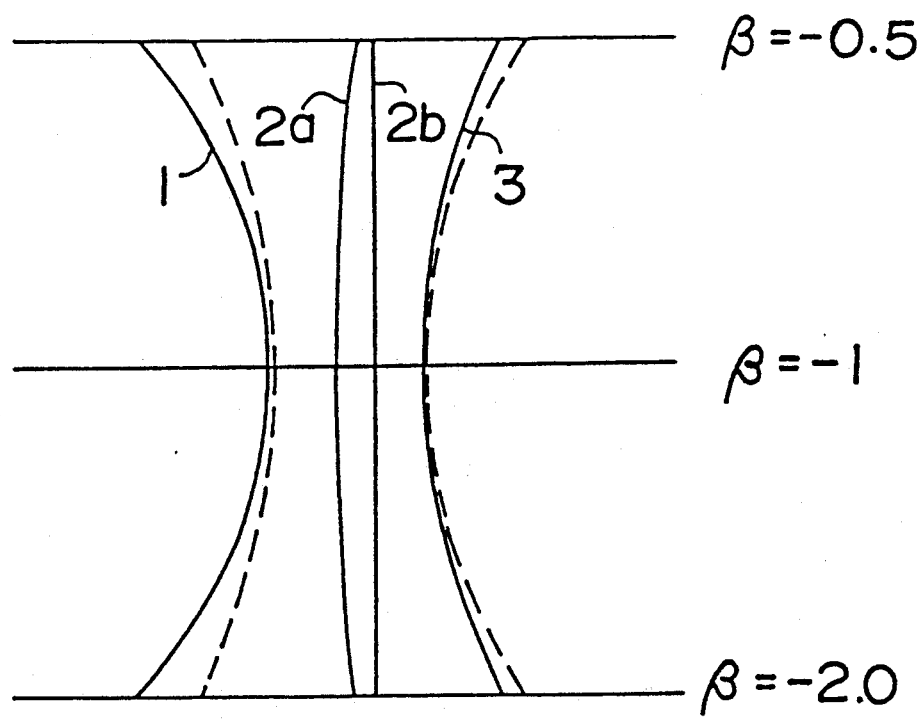
FIG. 20 is a diagram showing lens movements during zooming.

In FIG. 20, movements of the first lens unit 1, the third lens unit 3 and the front and rear components 2a and 2b of the second lens unit 2 during zooming are respectively shown by solid lines. As seen from FIG. 20, the first lens unit 1 and the third lens unit 3 are moved asymmetrically to the second lens unit 2 (for reference, symmetric movements are shown by dotted lines). Aberrations are corrected in a wide range between −0.5× and −2.0× by slightly varying an axial distance $d_6$ between the third and fourth lens elements of the second lens unit 2 and moving the entire lens system along the optical axis.

Moreover, the following conditions (1) and (2) are fulfilled:

$$0.4 < \frac{F_2}{F} < 0.65 \quad (1)$$

$$0.9 < \frac{F_1}{F_3} < 1.4 \quad (2)$$

where F is a focal length of the entire lens system, $F_1$ is a focal length of the first lens unit 1, $F_2$ is a focal length of the second lens unit 2 and $F_3$ is a focal length of the third lens unit 3 at unity magnification when a magnification $\beta$ is −1.

The condition (1) is a condition for determining the power arrangement of the second lens unit 2. When the upper limit of the condition (1) is exceeded, although aberrations are excellently corrected since the power of the second lens unit 2 is weakened, it is required to reduce the negative powers of the first lens unit 1 and the third lens unit 3 in order to reduce the size of the lens system at unity magnification, whereby the lens movement amount during zooming is increased. As a result, it is impossible to reduce the size of the entire lens system including the size of the lens system changed by zooming. When the lower limit of the condition (1) is exceeded, conversely, it is possible to reduce the size of the lens system since the movement amount during zooming is reduced because of the increased powers of the first lens unit 1 and the third lens unit 3. However, it is very difficult to correct aberrations at unity magnification and during zooming since the power of the second lens unit 2 mainly for aberration correction is increased.

The condition (2) is a condition for determining the power distributions of the first lens unit 1 and the third lens unit 3 and for determining the degree of asymmetry. When the limits of the condition (2) are exceeded, since the power is excessively different between the front and rear of the lens system, an asymmetric aberration such as off-axial coma is greatly generated, which aberration is difficult to correct. Moreover, variation is distortion is excessive during zooming.

Moreover, in the zoom lens system, for use in a copying apparatus, of the present invention, the distance $d_2$ between the first lens unit 1 and the second lens unit 2 and the distance $d_8$ between the second lens unit 2 and the third lens unit 3 vary asymmetrically to the second lens unit 2, and the following conditions (3) to (6) are fulfilled:

$$0.9 \leq \frac{R|\beta| > 1}{R|\beta| < 1} < 1.3 \quad (3)$$

$$0.2 < \frac{r_1}{F_1} < 0.8 \quad (4)$$

$$0.1 < \left|\frac{r_{10}}{F_3}\right| < 0.5 \quad (5)$$

$$\left|\frac{\Delta D_{3,4}}{\Delta D_{1,2}}\right|, \left|\frac{\Delta D_{3,4}}{\Delta D_{2,3}}\right| < 0.1 \quad (6)$$

where $F_1$ is a focal length of the first lens unit 1, $F_3$ is a focal length of the third lens unit 3, $r_i$ is a radius of curvature of an ith surface, $R|\beta|<1$ is a ratio of a variation amount $\Delta D_{2,3}$ of the distance between the second lens unit 2 and the third lens unit 3 to a variation amount $\Delta D_{1,2}$ of the distance between the first lens unit 1 and the second lens unit 2 at a magnification less than unity, $R|\beta|<1$ is a ratio of the variation amount $\Delta D_{2,3}$ of the distance between the second lens unit 2 and the third lens unit 3 to the variation amount $\Delta D_{1,2}$ of the distance between the first lens unit 1 and the second lens unit 2 at a magnification greater than unity, and $\Delta D_{3,4}$ is a variation amount of the axial distance between the third and fourth lens elements during zooming.

The condition (3) is a condition for determining asymmetry at zooming. When the limits of the condition (3) are exceeded, it is difficult to correct both field curvature and distortion in the entire zoom range. When the upper limit thereof is exceeded, variation in distortion increases. When the lower limit thereof is exceeded, it is impossible to correct field curvature at a magnification greater than unity.

The conditions (4) and (5) are conditions for defining the configurations of the first lens element of the first lens unit 1 and the fifth lens element of the third lens unit 3 and for determining the powers of the concave surfaces arranged on the most object side and the most image side of the lens system. The conditions (4) and (5) relate chiefly to correction of aberrations of off-axial light. By fulfilling the conditions (4) and (5), the aberrations are excellently corrected both at unity magnification and during zooming. When the upper limits of the conditions (4) and (5) are exceeded, field curvature is generated. The generation of field curvature is remarkable particularly during zooming, and it is difficult to correct it. When the lower limits thereof are exceeded, coma flare is generated particularly during zooming, and it is difficult to correct it.

The condition (6) is a condition for determining the variation amount of the distance between the third and fourth lens elements of the second lens unit 2. When the limits of the condition (6) are exceeded, variations in aberrations during zooming are excessive. As a result, it is very difficult to correct the aberrations.

Further, the zoom lens system, for use in a copying apparatus, of the present invention fulfills the following conditions (7) to (9):

$$0.7 < \frac{f_2}{F_2} < 1.2 \quad (7)$$

$$0.01 < \frac{f_3 + f_4}{F_2} < 0.13 \quad (8)$$

$$0.05 < \frac{d_3}{F_2} < 0.12 \quad (9)$$

where $f_i$ is a focal length of an ith lens element, $d_3$ is an axial distance of the second lens element of the second lens unit 2 and $F_2$ is a focal length of the second lens unit 2. The conditions (7), (8) and (9) are conditions for determining the power distribution of the second lens unit 2.

The condition (7) is a condition for determining the power of the second lens element. When the upper limit of the condition (7) is exceeded, spherical aberration is over-corrected while astigmatism increases. When the lower limit thereof is exceeded, spherical aberration is under-corrected while coma flare is generated.

The condition (8) is a condition for determining the power distributions of the third and fourth lens elements. When the upper limit of the condition (8) is exceeded, spherical aberration is over-corrected. When the lower limit thereof is exceeded, field curvature is excessive.

The condition (9) is a condition for defining the thickness of the second lens elements. When the upper limit of the condition (9) is exceeded, spherical aberration is over-corrected. Moreover, the lens thickness is excessive so that it is impossible to reduce the size of the lens system which is an object of the present invention. When the lower limit thereof is exceeded, more coma flare is generated. Moreover, it is difficult to correct spherical aberration and distortion.

In addition, it is desirable that the following condition (10) is fulfilled:

$$0.18 < \frac{{}^2\Sigma d}{F_2} < 0.4 \quad (10)$$

where ${}^2\Sigma d$ is a sum of the axial distances of the second lens unit 2.

By fulfilling the condition (10), a lens system which is compact and where aberrations are excellently corrected is realized.

Needless to say, this zoom lens system can be used even if the image forming surface (image surface) and the object surface are reversed. Moreover, since this zoom lens system is of an asymmetric lens configuration, a long distance can be secured from the object surface to the zoom lens system if the lens system is used under the condition shown in the figures. Particularly at a magnification greater than unity, more space is available compared to the lens system of a symmetric configuration, which is advantageous in mechanical arrangement of a copying apparatus. Further, when this zoom lens system of the above-mentioned reverse arrangement is used, a result which is reverse to the above-mentioned result is obtained.

Subsequently, a fourth to ninth embodiments of the present invention will be described.

FIGS. 4 to 9 are cross-sectional views showing arrangements of the fourth to ninth embodiments of the present invention. The fourth to ninth embodiments comprise from the object side: a first lens unit 1 of a negative power (the first lens unit 1) including a first lens element which is a negative meniscus lens element concave to the object side; a second lens unit 2 of a positive power (the second lens unit 2) including a second lens element which is a positive meniscus lens element convex to the object side, a third lens element which is a biconcave lens element whose object side surface has a larger radius of curvature and a fourth lens element which is a biconvex lens element; and a third lens unit of a negative power (the third lens unit 3) including a fifth lens element which is a negative meniscus lens element concave to the image side. By varying a distance $d_2$ between the first lens unit 1 and the second lens unit 2 and a distance $d_5$ between the second lens unit 2 and the third lens unit 3 are varied as well as by moving the entire lens system, magnification is varied while the conjugate distance is maintained constant.

Moreover, the following conditions (11) and (12) are fulfilled:

$$0.35 < \frac{F_2}{F} < 0.75 \quad (11)$$

$$0.95 < \frac{F_1}{F_3} < 1.4 \quad (12)$$

where F is a focal length of the entire lens system, $F_1$ is a focal length of the first lens unit 1, $F_2$ is a focal length of the second lens unit 2 and $F_3$ is a focal length of the third lens unit 3 at a magnification $\beta$ of $-1$.

The condition (11) is a condition for determining the power arrangement of the second lens unit 2. When the upper limit of the condition (11) is exceeded, although aberrations are excellently corrected since the power of the second lens unit 2 is weakened, it is required to reduce the negative powers of the first lens unit 1 and the third lens unit 3 in order to reduce the size of the lens system at unity magnification, whereby the lens movement amount during zooming is increased. As a result, it is impossible to reduce the size of the entire lens system including the size of the lens system changed by zooming. When the lower limit of the condition (11) is exceeded, conversely, it is possible to reduce the size of the lens system since the movement amount during zooming is reduced because of the increased powers of the first lens unit 1 and the third lens unit 3. However, it is very difficult to correct aberrations at unity magnification and during zooming since the power of the second lens unit 2 mainly for aberration correction is increased.

The condition (12) is a condition for determining the power distributions of the first lens unit 1 and the third lens unit 3 and for determining the degree of asymmetry. When the upper and lower limits of the condition (12) are exceeded, since the power is excessively different between the front and rear of the lens system, an asymmetric aberration such as off-axial coma is greatly generated, which aberration is difficult to correct. Moreover, variation in distortion is excessive during zooming.

Further, in the zoom lens system, for use in a copying apparatus, of the present invention, the first lens unit 1 and the third lens unit 3 fulfill the following conditions (13) and (14):

$$0.2 < \frac{r_1}{F_1} < 0.7 \quad (13)$$

$$0.15 < \left| \frac{r_{10}}{F_3} \right| < 0.5 \quad (14)$$

where $F_1$ is a focal length of the first lens unit 1, $F_3$ is a focal length of the third lens unit 3 and $r_i$ is a radius of curvature of an ith surface.

The conditions (13) and (14) are conditions for defining the configurations of the negative meniscus lens elements of the first lens unit 1 and the third lens unit 3 and for determining the power of the most object side surface and the most image side surface of the lens system. The conditions (13) and (14) relate chiefly to correction of aberrations of off-axial light. By fulfilling these conditions (13) and (14), aberrations are excellently corrected at unity magnification and during zooming. When the upper limits of the conditions (13) and (14) are exceeded, field curvature increases. The increase of field curvature is remarkable particularly during zooming, and it is extremely difficult to correct it. When the lower limits thereof are exceeded, coma flare is generated particularly during zooming.

Further, the zoom lens system, for use in a copying apparatus, of the present invention fulfills the following conditions (15) to (17):

$$0.7 < \frac{f_2}{F_2} < 1.2 \quad (15)$$

$$0.01 < \frac{f_3 + f_4}{F_2} < 0.13 \quad (16)$$

$$0.05 < \frac{d_3}{F_2} < 0.12 \quad (17)$$

where $f_i$ is a focal length of an ith lens element, $d_3$ is an axial distance of the second lens element of the second lens unit 2 and $F_2$ is a focal length of the second lens unit 2. The conditions (15), (16) and (17) are conditions for determining the power distribution of the second lens unit 2.

The condition (15) is a condition for defining the power of the second lens unit. When the upper limit of the condition (15) is exceeded, spherical aberration is over-corrected while astigmatism increases. When the lower limit thereof is exceeded, spherical aberration is under-corrected while coma flare is generated.

The condition (16) is a condition for defining the power distributions of the third and fourth lens elements of the second lens unit 2. When the upper limit of the condition (16) is exceeded, spherical aberration is over-corrected. When the lower limit thereof is exceeded, field curvature is excessive.

The condition (17) is a condition for defining the thickness of the second lens element of the second lens unit 2. When the upper limit of the condition (17) is exceeded, spherical aberration is over-corrected. Moreover, the lens thickness is excessive so that it is impossible to reduce the size of the lens system which is an object of the present invention. When the lower limit thereof is exceeded, more coma flare is generated. Moreover, it is impossible to correct spherical aberration and distortion.

In addition, a lens system which is compact and where aberrations are excellently corrected is realized by fulfilling the following condition (18):

$$0.18 < \frac{{}^2\Sigma d}{F_2} < 0.40 \quad (18)$$

where ${}^2\Sigma d$ is a sum of axial distances $d_i$ in the second lens unit 2 and $F_2$ is a focal length of the second lens unit 2.

Needless to say, this zoom lens system can be used even if the image forming surface (image surface) and the object surface are reversed. Moreover, since this zoom lens system is of asymmetric lens configuration, a long distance can be secured from the object surface to the zoom lens system if the image surface and the object surface are not reversed. Particularly at a magnification greater than unity, more space is available compared to the lens system of symmetric configuration, which is advantageous in mechanical arrangement. Further, when this zoom lens system of the above-mentioned reverse arrangement is used, a reverse result is obtained.

Tables 1 to 9 show data on the first to ninth embodiments of the present invention, respectively. In each Table, $r_i$ ($i=1, 2, 3, \ldots, 10$) is a radius of curvature of an ith lens surface counted from the object side, $d_i$ ($i=1, 2, 3, \ldots, 9$) is an axial distance counted from the object side, $N_i$ ($i=1, 2, 3, \ldots, 5$) is a refractive index, to the d-line, of an ith lens counted from the object side and $\nu_i$ ($i=1, 2, 3, \ldots, 5$) is an Abbe number of an ith lens counted from the object side.

Figure 10B:
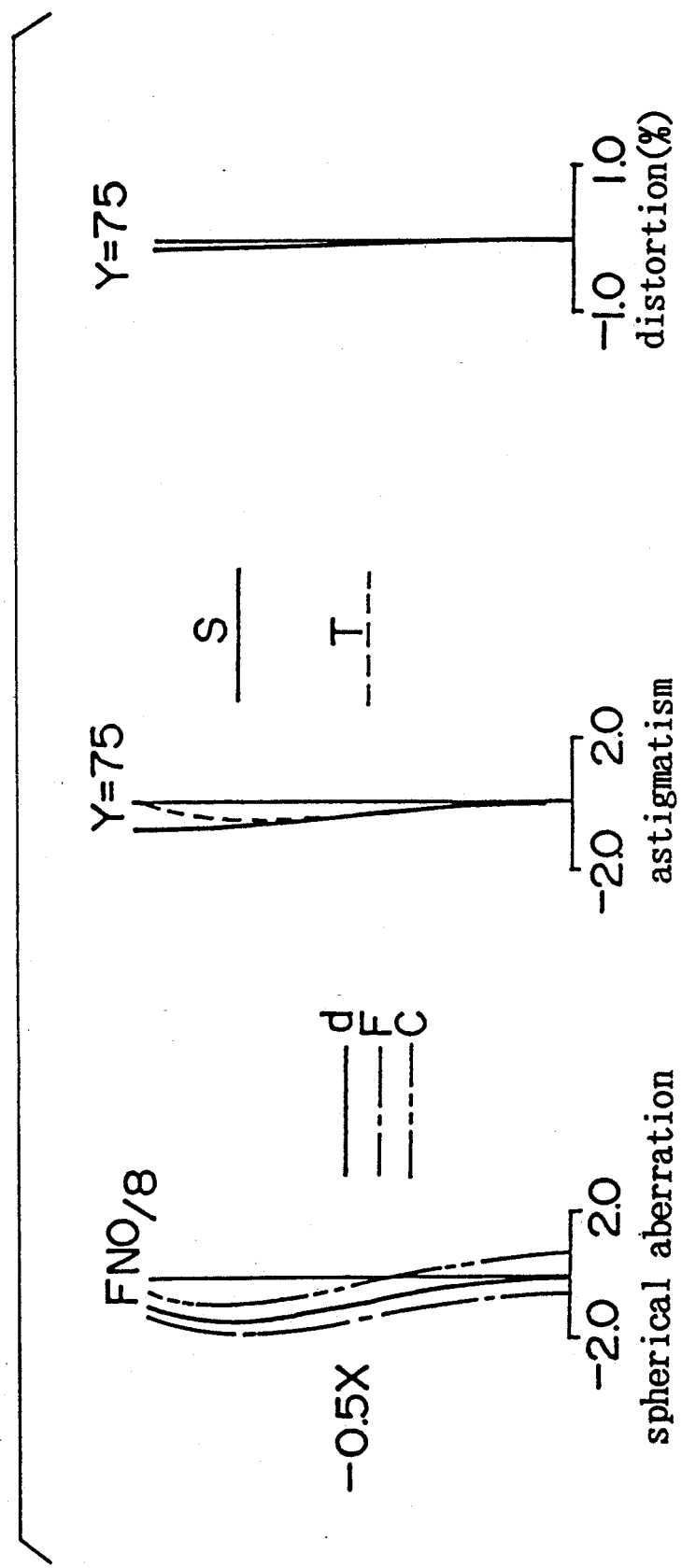
Figure 10C:
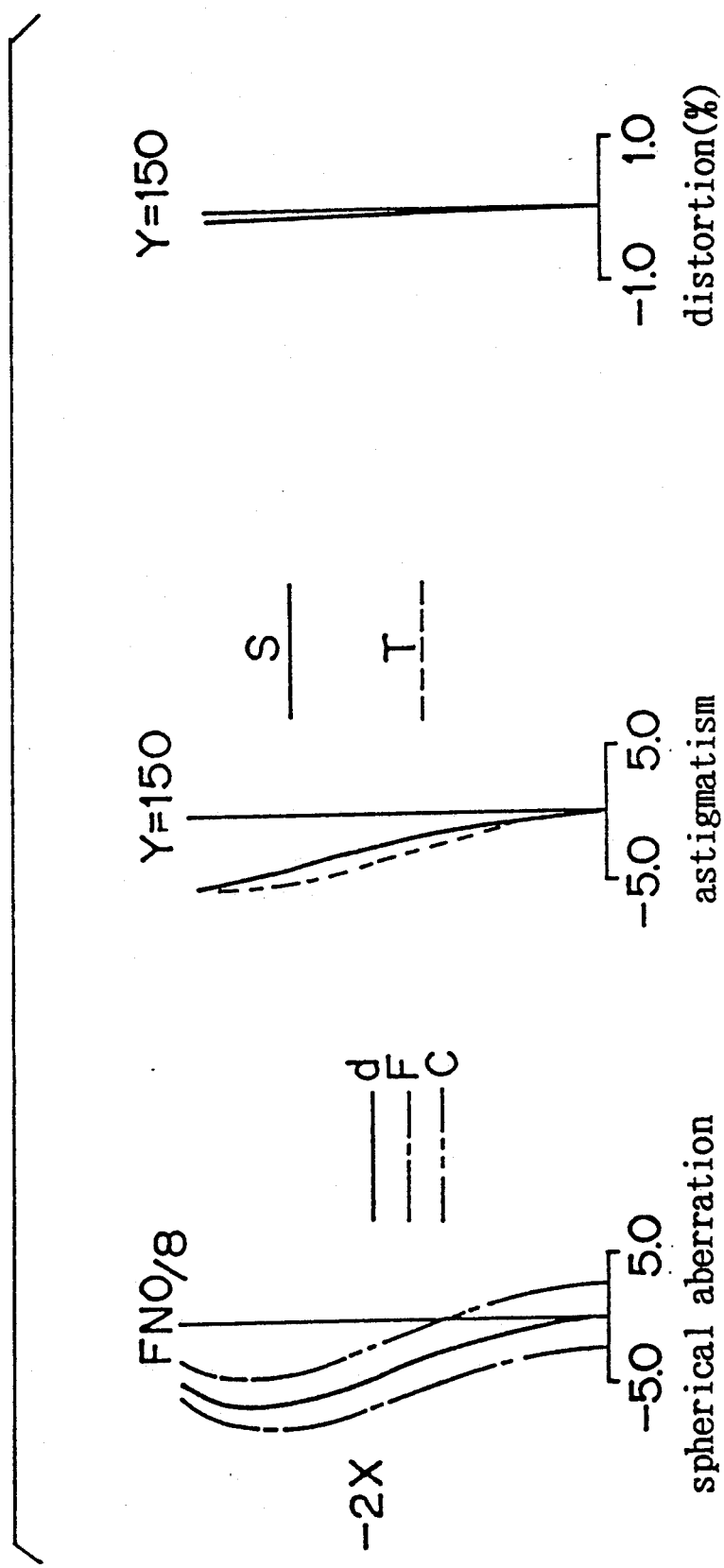
Figure 11A:
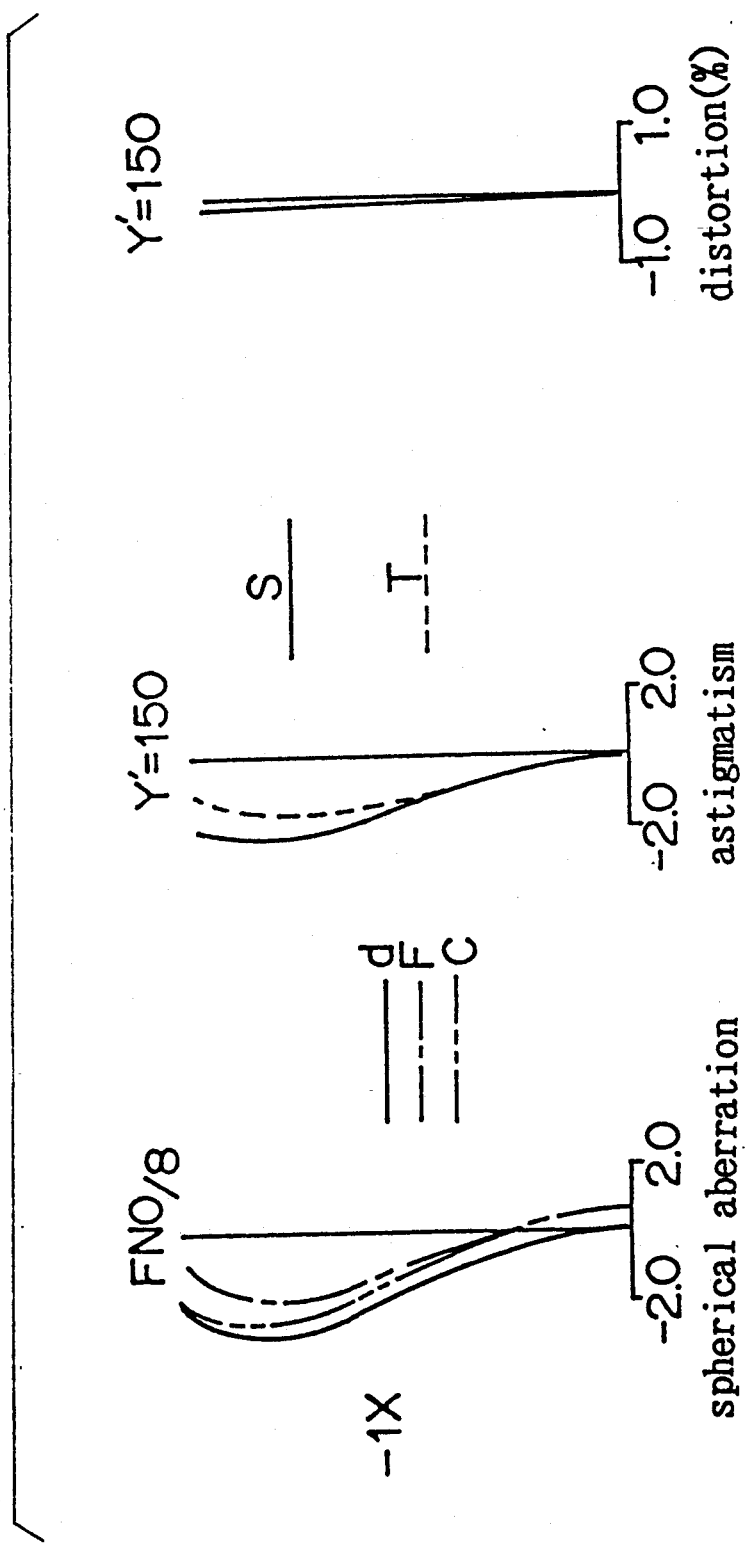
Figure 11C:
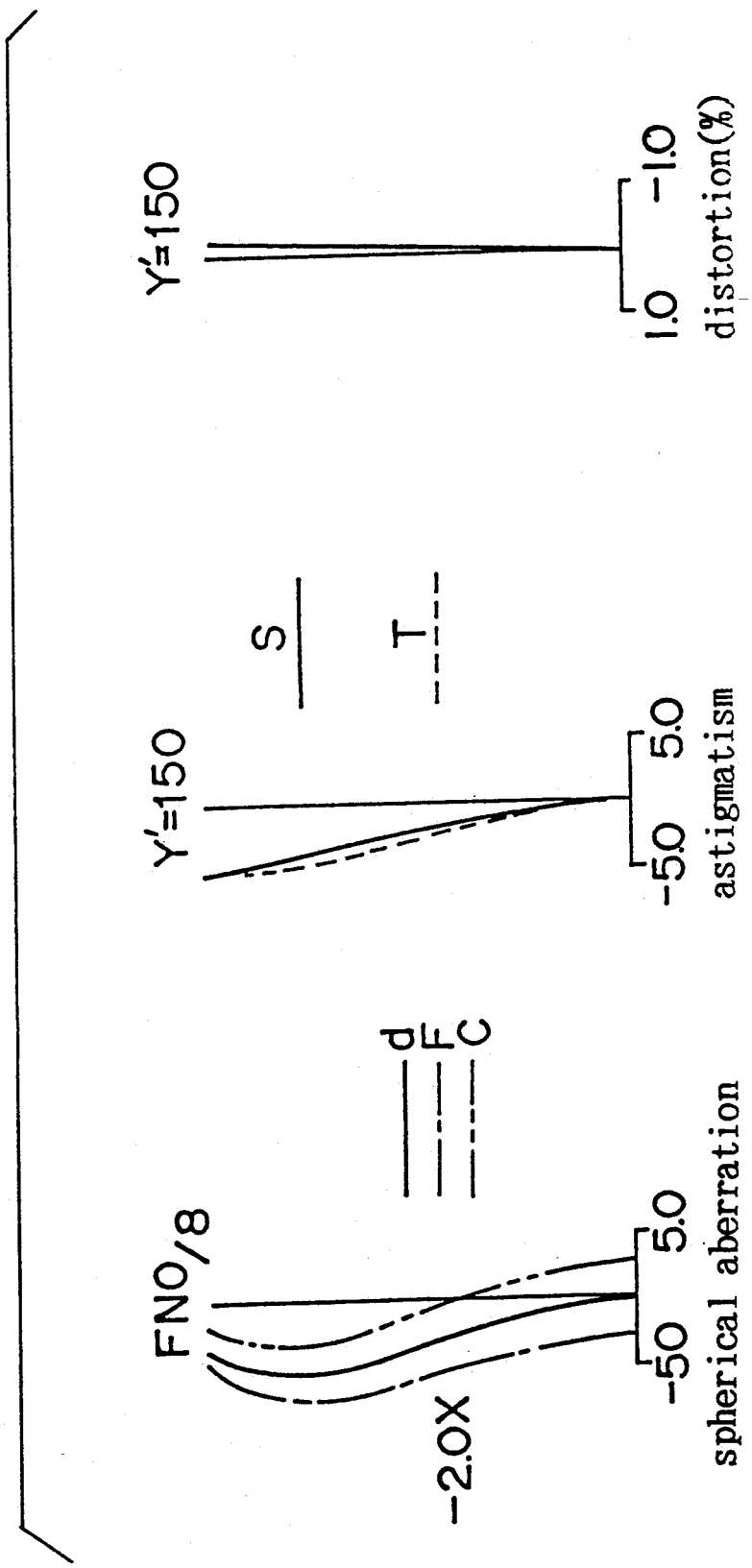
Figure 12A:
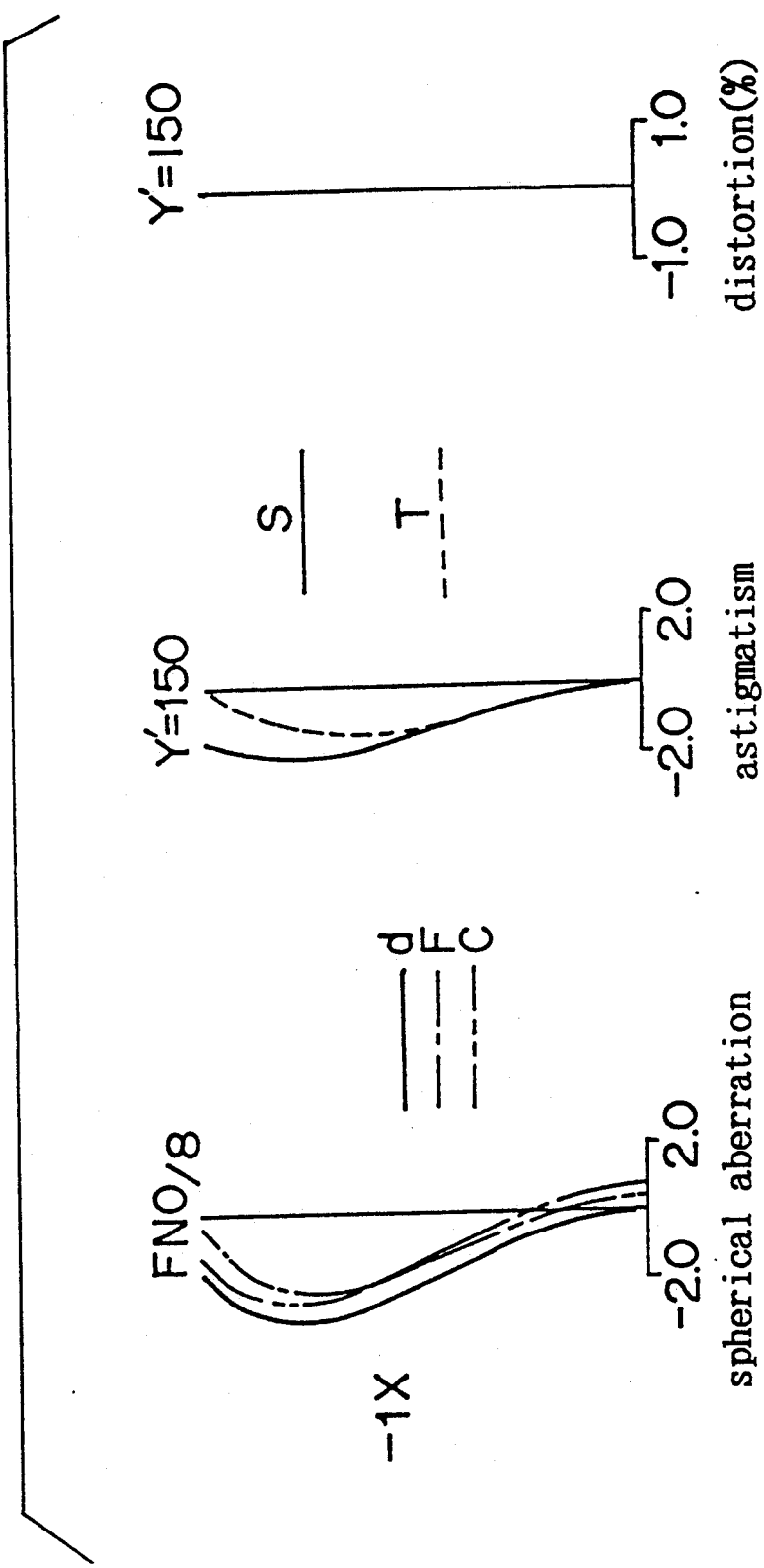
Figure 12B:
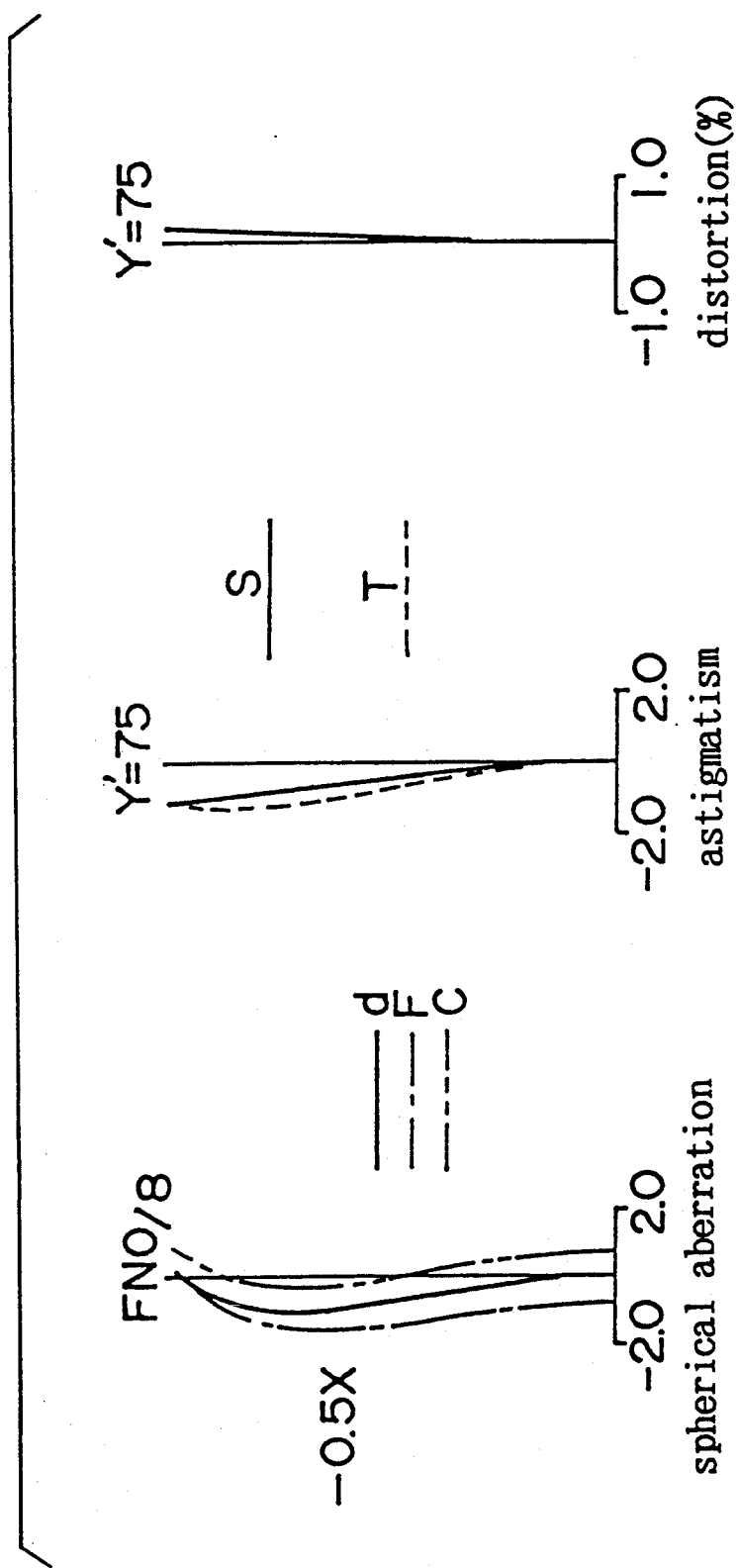
Figure 13B:
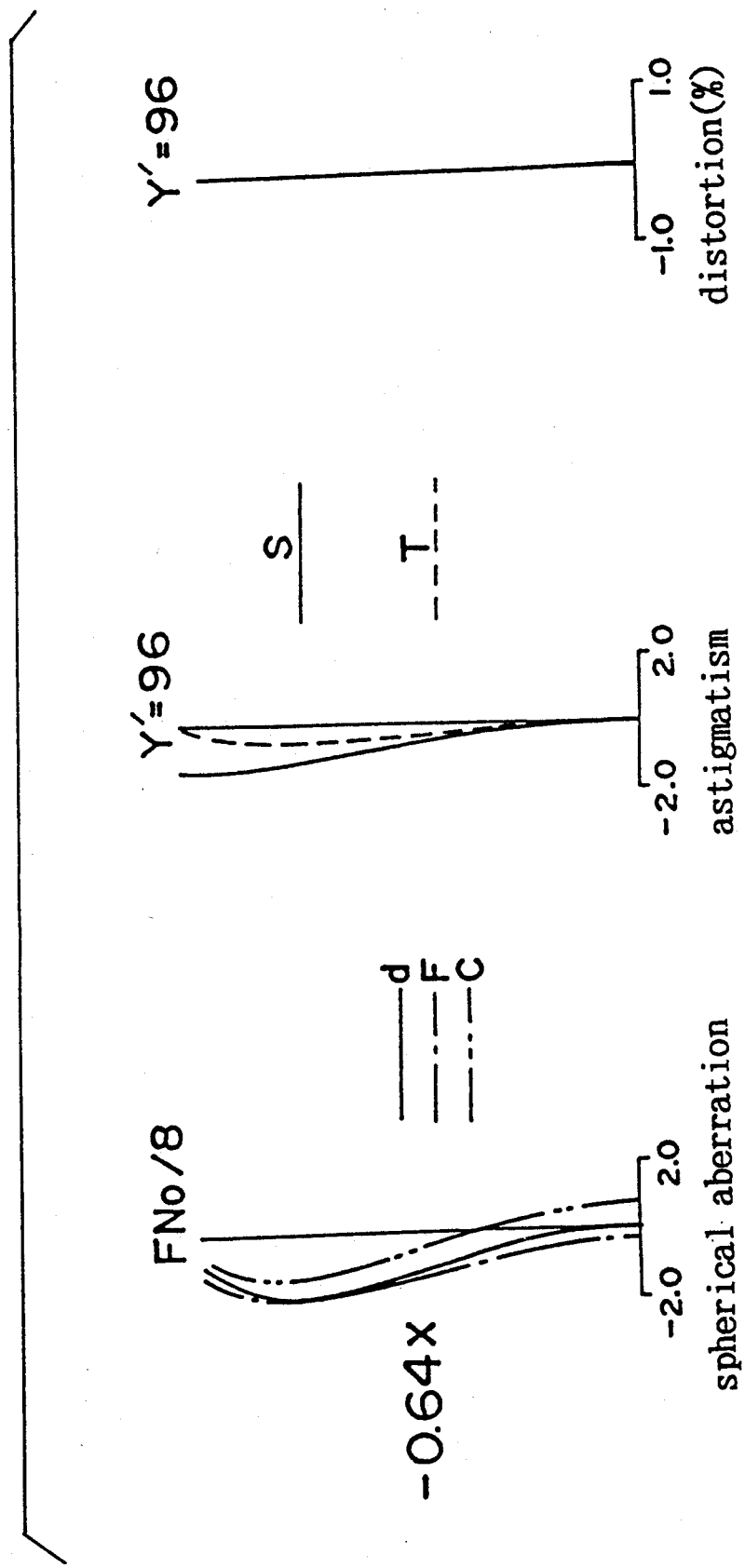
Figure 13C:
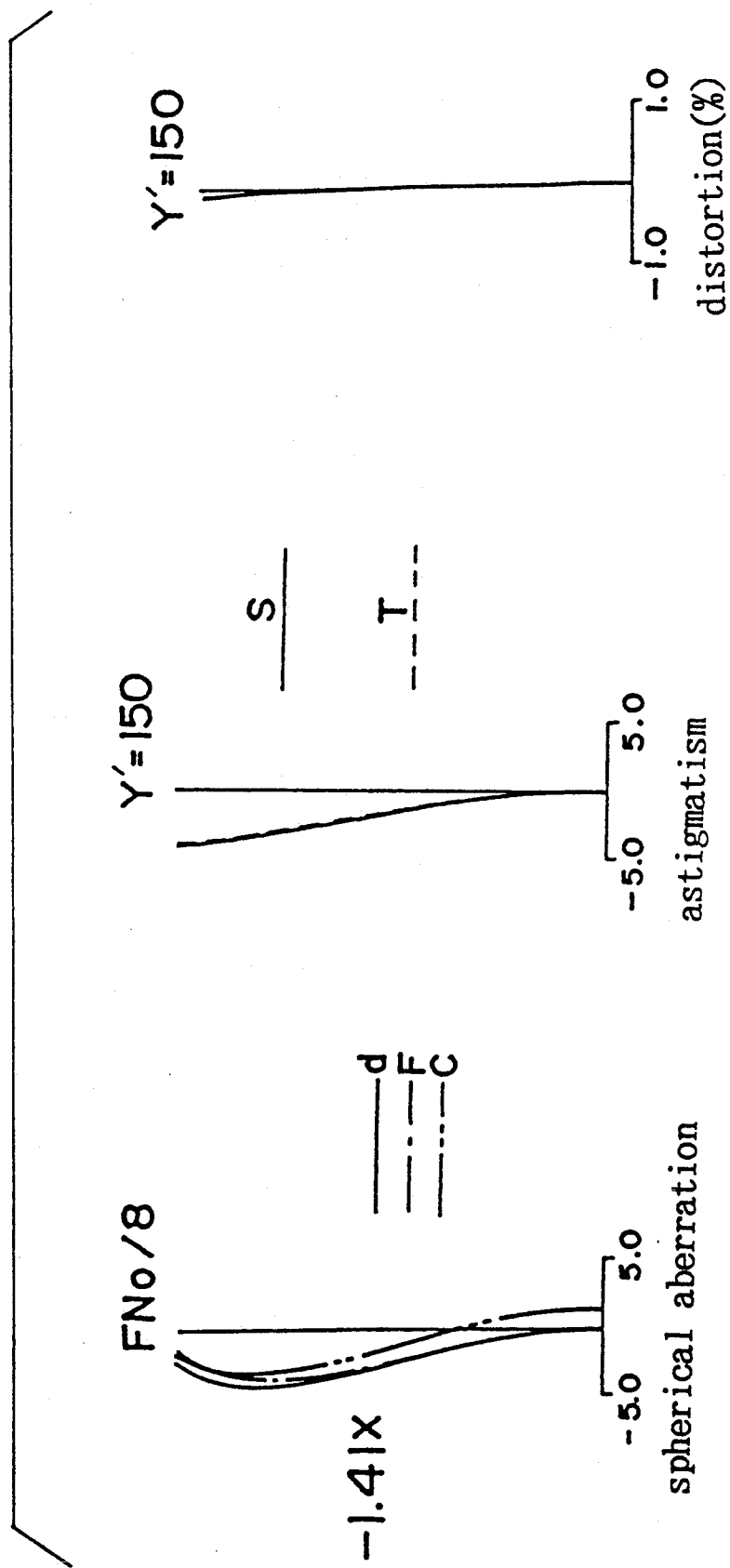
Figure 14A:
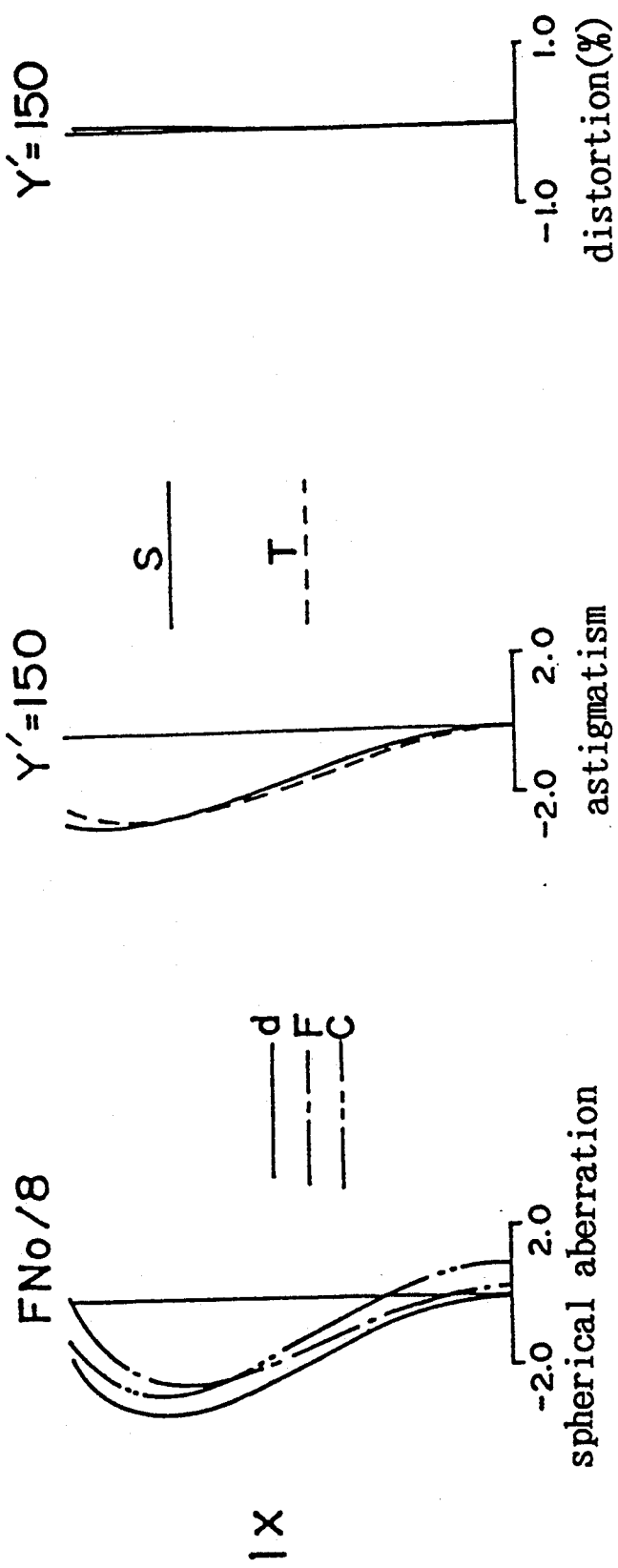
Figure 14B:
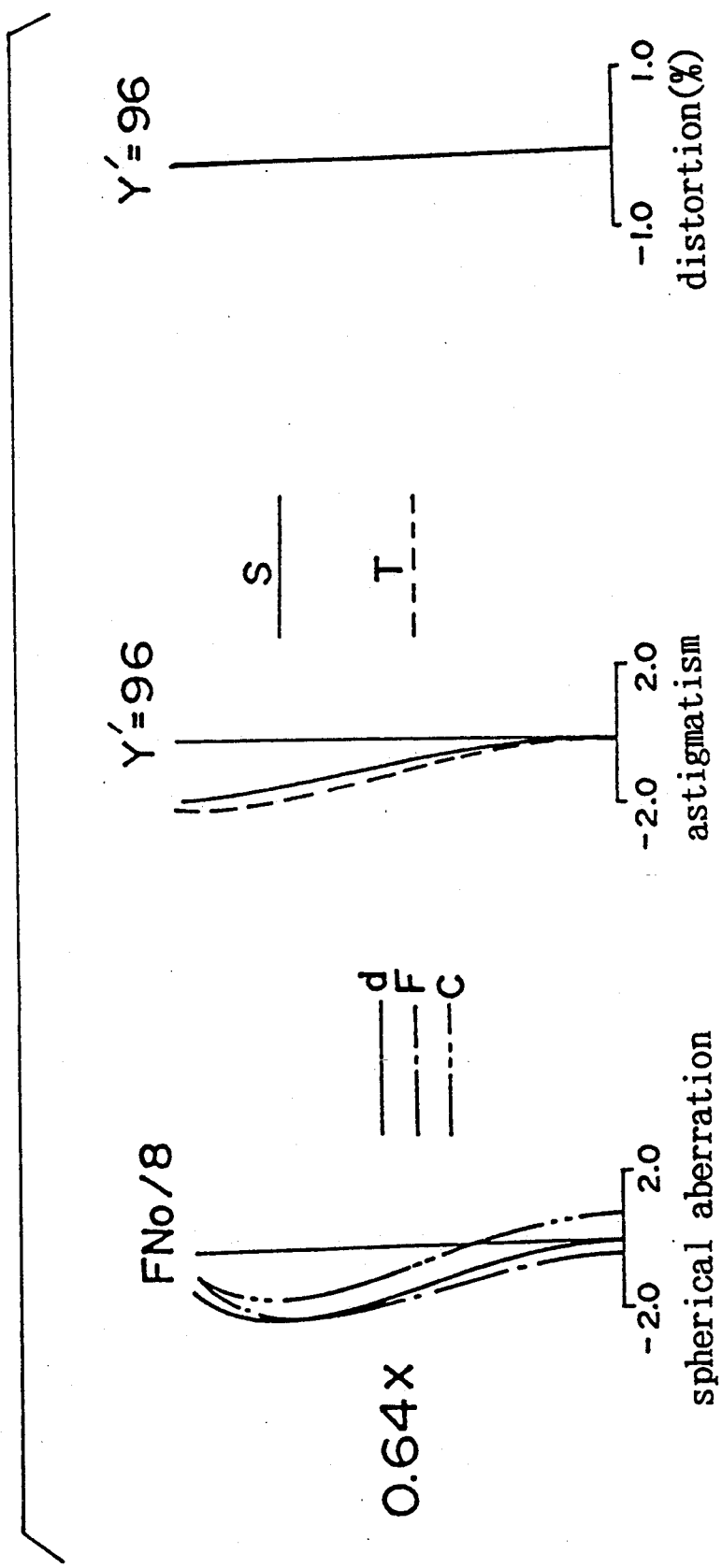
Figure 14C:
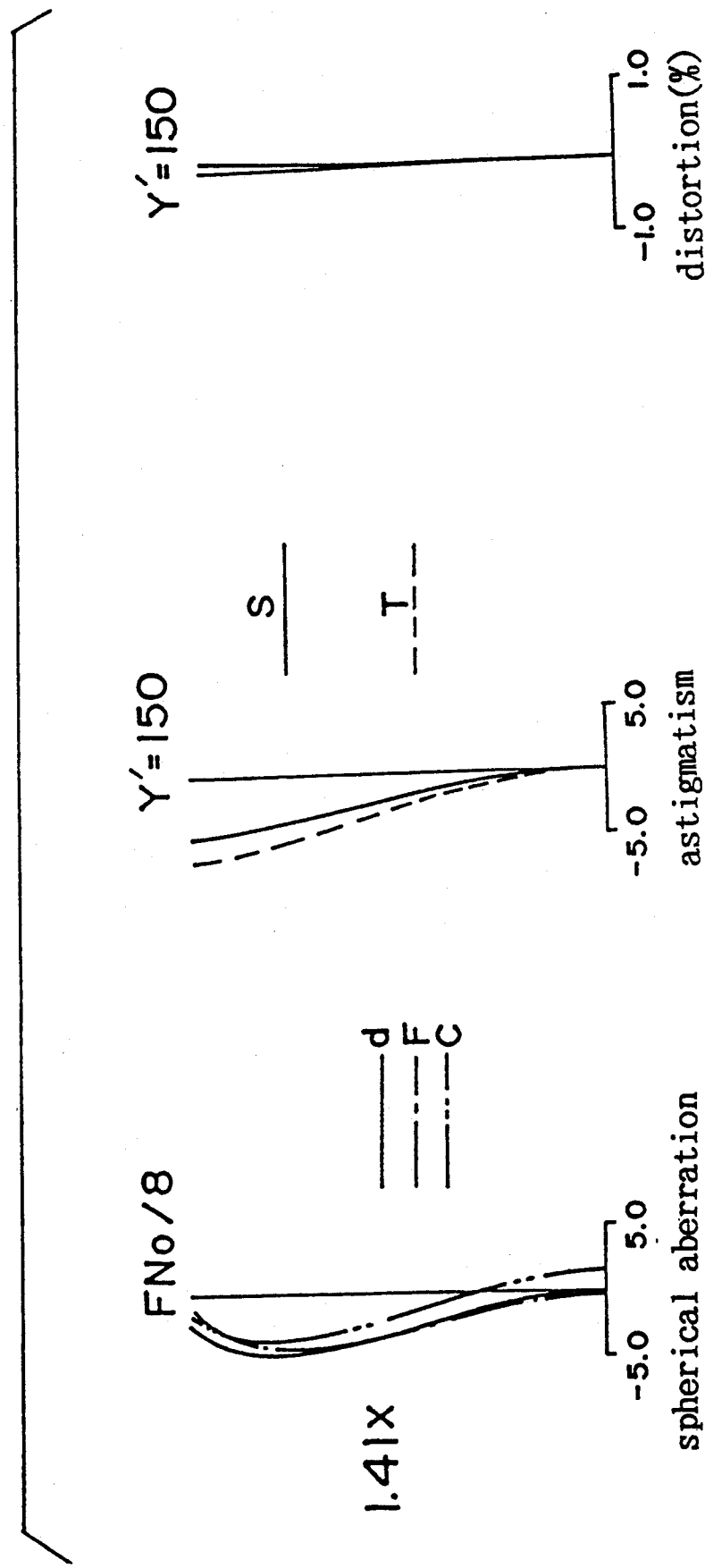
Figure 15A:
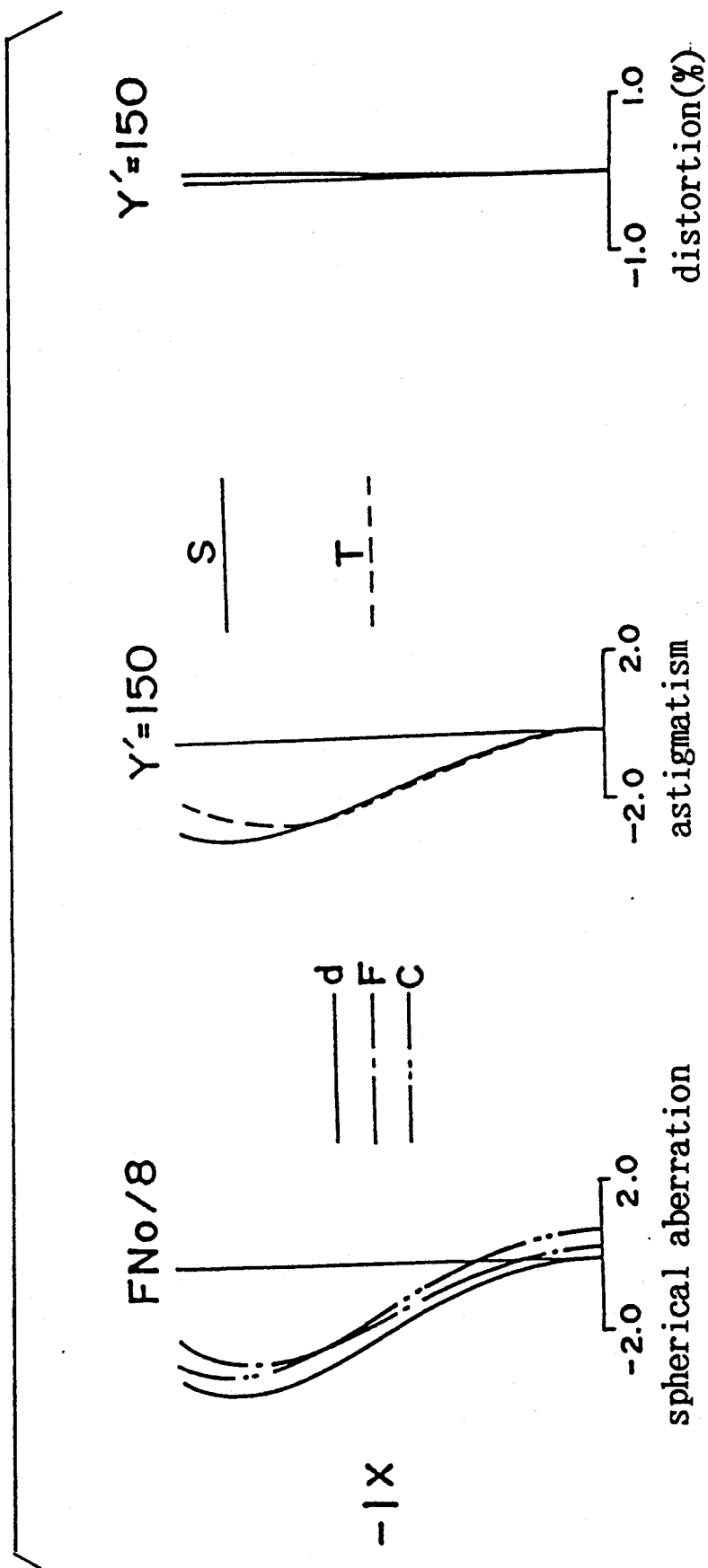
Figure 15C:
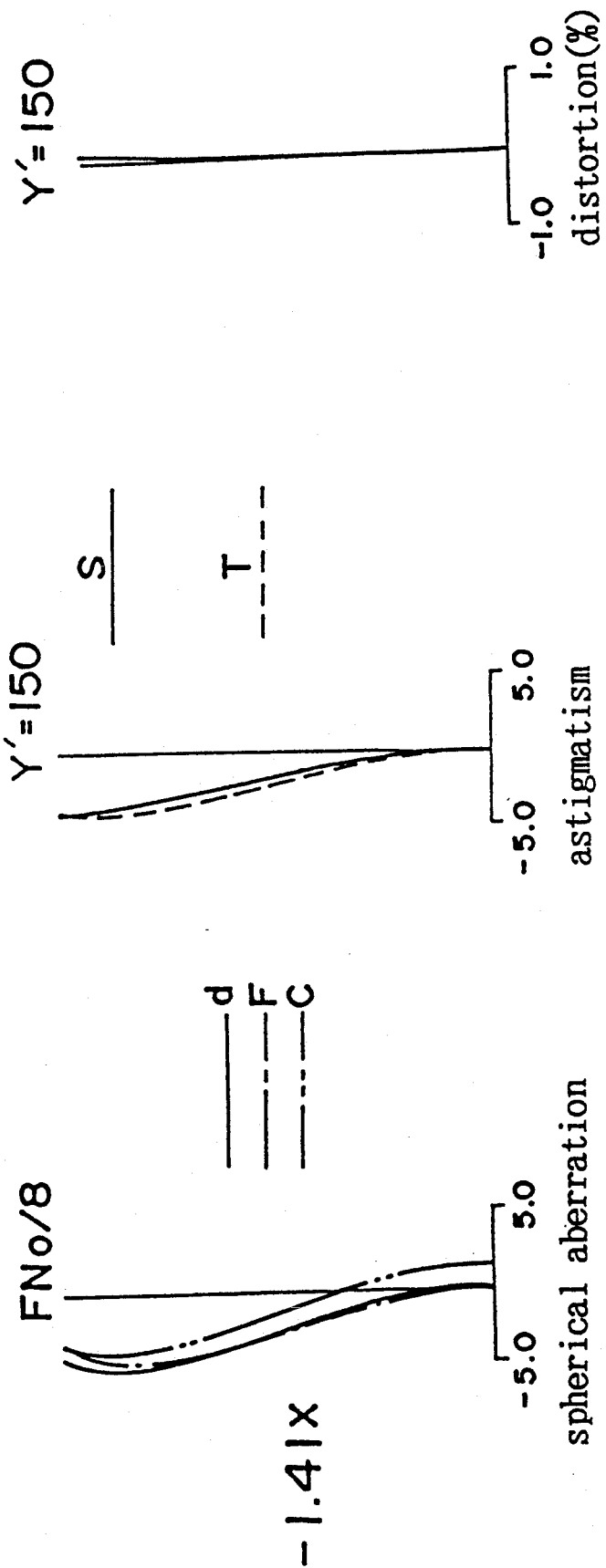
Figure 17A:
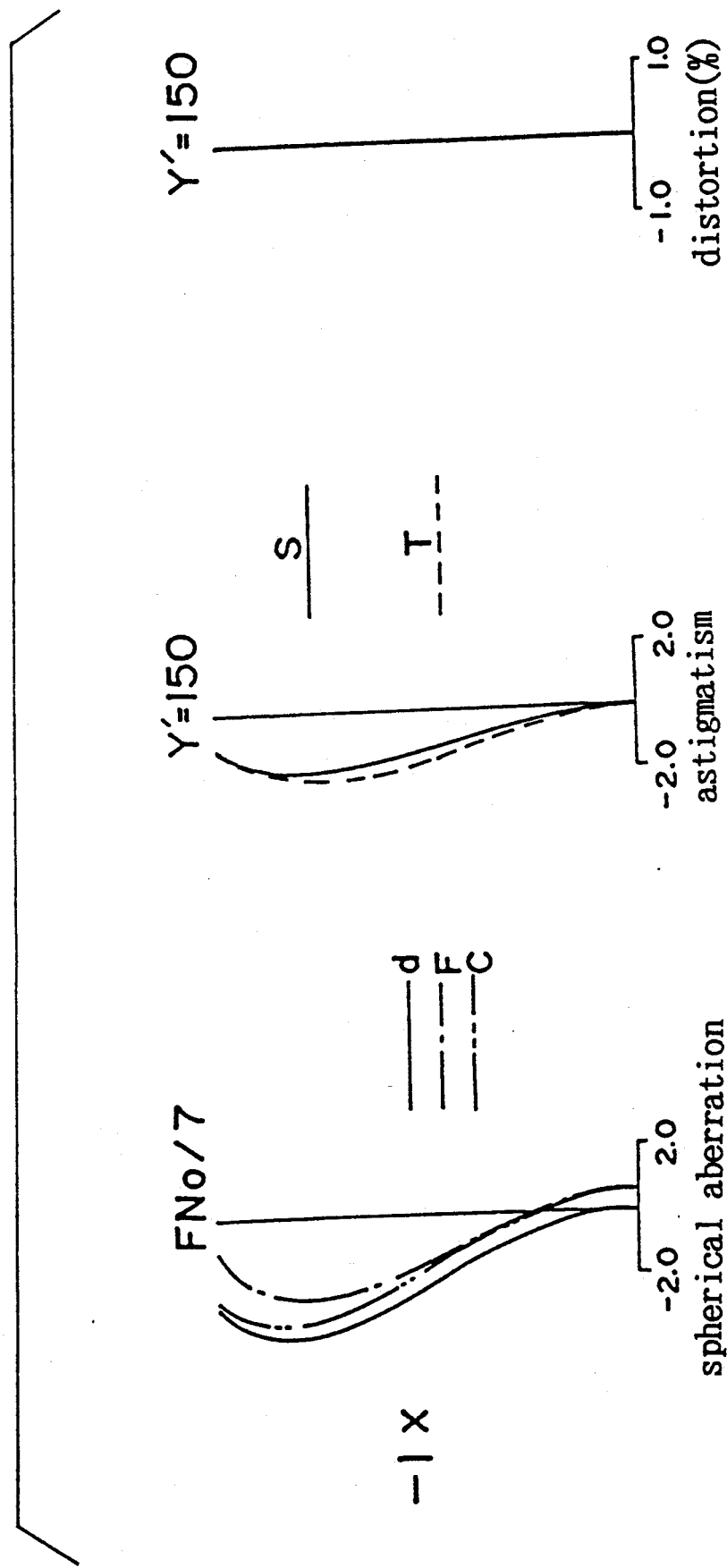
Figure 18A:
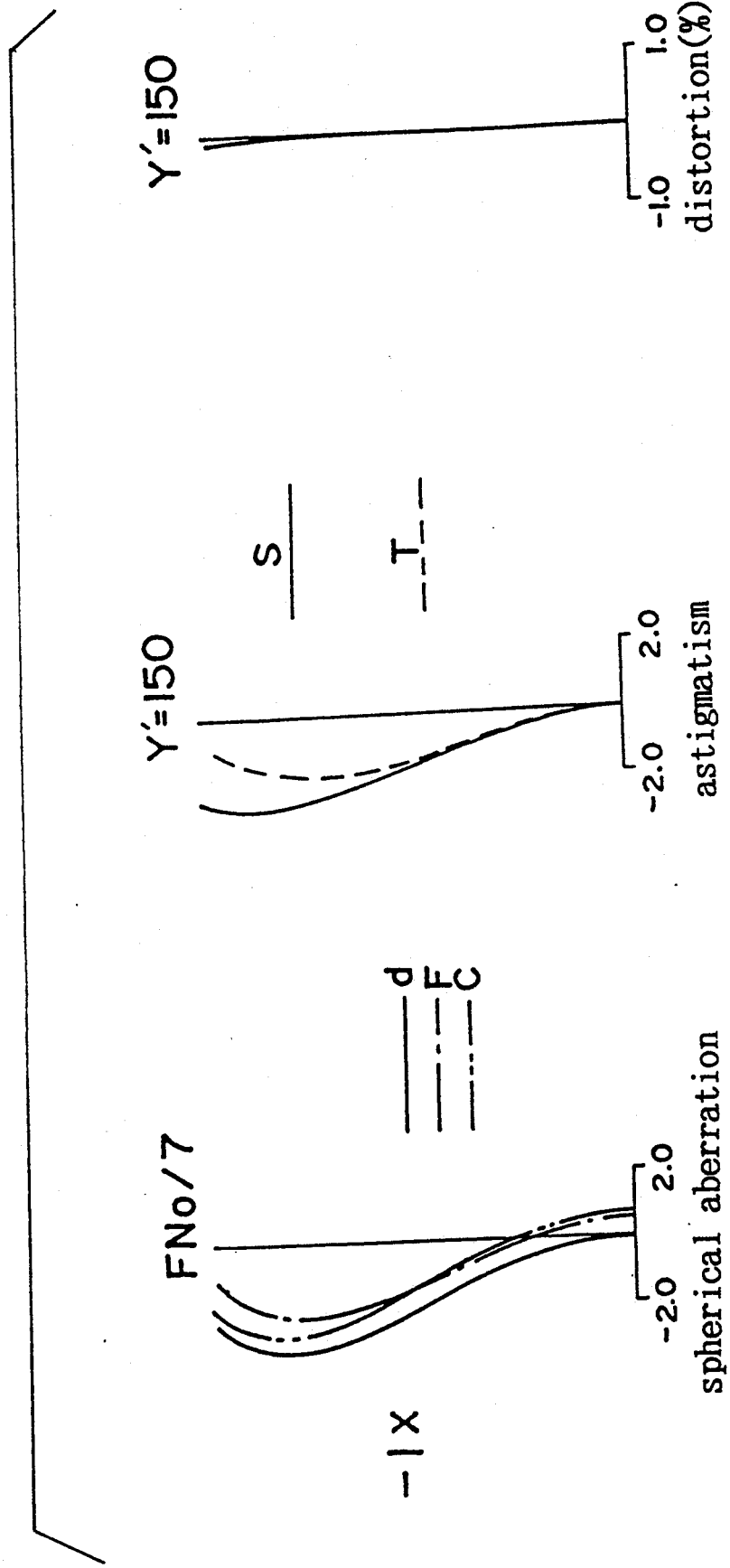
Figure 18B:
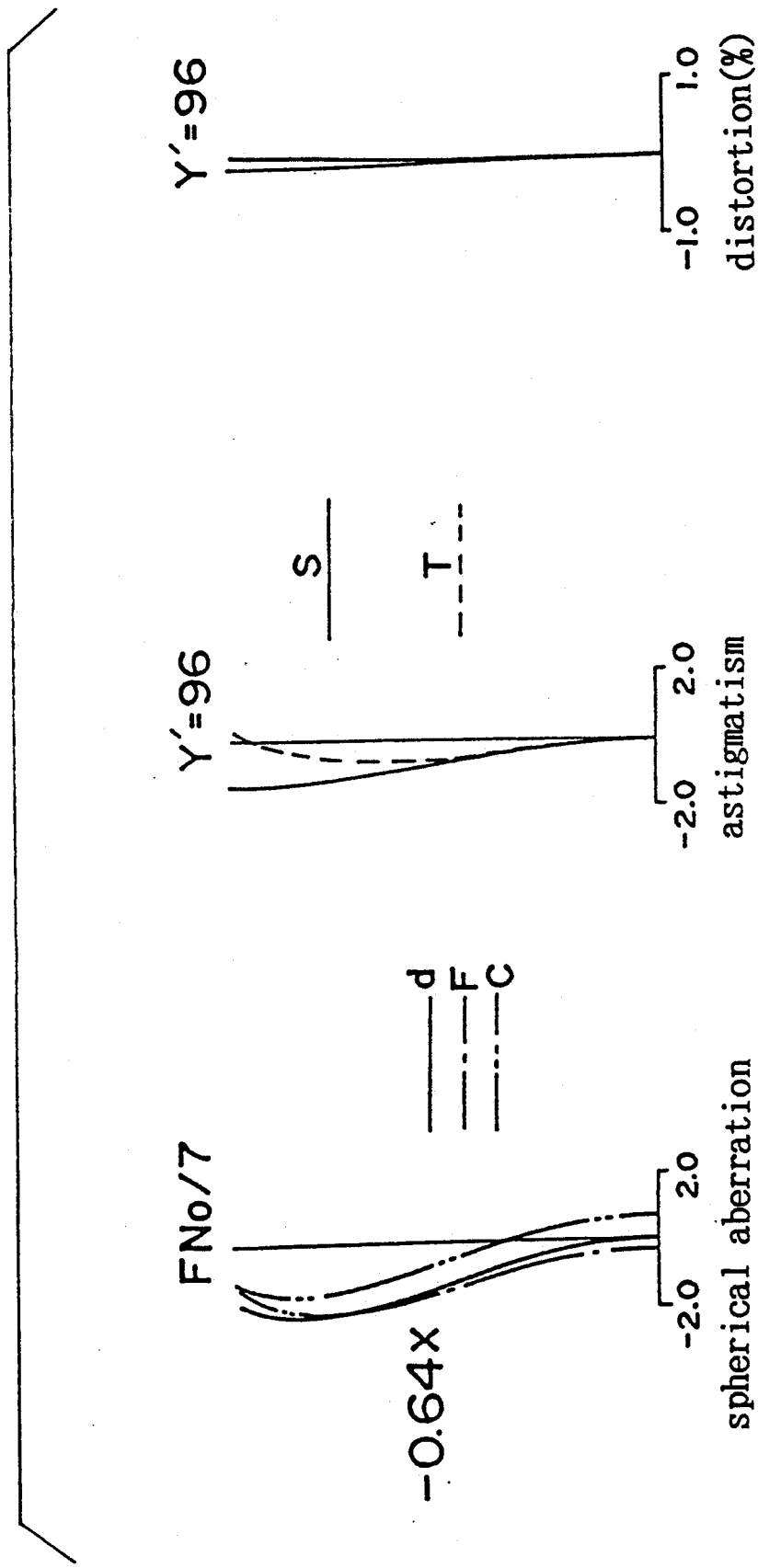
Figure 18C:
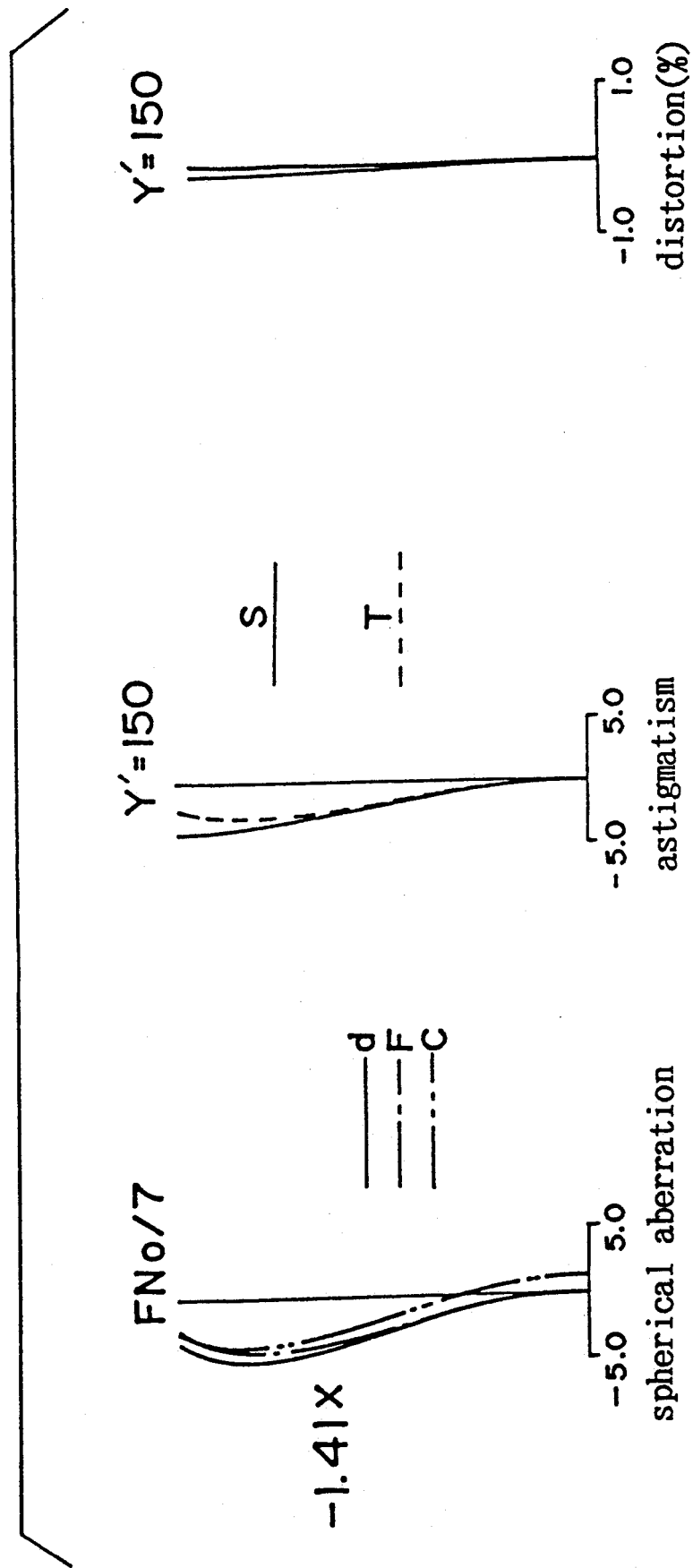

FIGS. 10A, 10B and 10C to 12A, 12B and 12C show graphic representations of aberrations of the first to third embodiments, respectively. FIGS. 10A, 11A and 12A show spherical aberration, astigmatism and distortion at a magnification of $-1\times$. FIGS. 10B, 11B and 12B show those at a magnification of $-0.50\times$. FIGS. 10C, 11C and 12C show those at a magnification of $-2.00\times$.

Moreover, FIGS. 13A, 13B and 13C to 18A, 18B and 18C show graphic representations of aberrations of the fourth to ninth embodiments, respectively. FIGS. 13A, 14A, 15A, 16A, 17A and 18A show spherical aberration, astigmatism and distortion at a magnification of $-1\times$. FIGS. 13B, 14B, 15B, 16B, 17B and 18B show those at a magnification of $-0.64\times$. FIGS. 13C, 14C, 15C, 16C, 17C and 18C show those at a magnification of $-1.41\times$.

Table 10 shows values for the above-mentioned conditions (1) to (10) concerning the first to third embodiments.

Table 11 shows value for the above-mentioned conditions (11) to (18) concerning the fourth to ninth embodiments are shown in Table 11.

TABLE 1

(Embodiment 1)
$f = 198.9$ to $176.1$  $\beta = -0.5$ to $-2.0$  FNo. $= 8.0$

| Radius of Curvature | Axial Distance | Refractive Index ($N_d$) | Abbe Number ($\nu$) |
|---|---|---|---|
| $r_1$ −187.45 | | | |
| | $d_1$ 3.00 | $N_1$ 1.6700 | $\nu_1$ 39.2 |
| $r_2$ −1000.00 | | | |
| | *$d_2$ 18.82 to 5.61 to 1.00 to 5.28 to 18.82 | | |
| $r_3$ 41.37 | | | |
| | $d_3$ 7.50 | $N_2$ 1.7170 | $\nu_2$ 47.9 |
| $r_4$ 147.76 | | | |
| | $d_4$ 3.10 | | |
| $r_5$ −206.15 | | | |
| | $d_5$ 3.40 | $N_3$ 1.6129 | $\nu_3$ 37.0 |
| $r_6$ 37.85 | | | |
| | *$d_6$ 6.60 to 6.86 to 6.95 to 6.87 to 6.60 | | |
| $r_7$ 76.03 | | | |
| | $d_7$ 6.40 | $N_4$ 1.7725 | $\nu_4$ 49.8 |
| $r_8$ −123.77 | | | |
| | *$d_8$ 10.73 to 4.26 to 2.00 to 4.10 to 10.73 | | |
| $r_9$ 107.60 | | | |
| | $d_9$ 4.00 | $N_5$ 1.6700 | $\nu_5$ 39.2 |
| $r_{10}$ 66.49 | | | |

TABLE 2

(Embodiment 2)
$f = 201.0$ to $177.8$  $\beta = -0.5$ to $-2.0$  FNo. $= 8.0$

| Radius of Curvature | Axial Distance | Refractive Index ($N_d$) | Abbe Number ($\nu$) |
|---|---|---|---|
| $r_1$ −212.00 | | | |
| | $d_1$ 4.00 | $N_1$ 1.6700 | $\nu_1$ 39.2 |
| $r_2$ ∞ | | | |
| | *$d_2$ 21.12 to 8.49 to 4.00 to 7.86 to 20.05 | | |
| $r_3$ 46.33 | | | |
| | $d_3$ 5.70 | $N_2$ 1.7495 | $\nu_2$ 50.0 |
| $r_4$ 153.89 | | | |
| | $d_4$ 8.10 | | |
| $r_5$ −148.46 | | | |
| | $d_5$ 3.20 | $N_3$ 1.6259 | $\nu_3$ 35.7 |
| $r_6$ 41.45 | | | |
| | *$d_6$ 4.46 to 4.71 to 4.80 to 7.72 to 4.49 | | |
| $r_7$ 71.82 | | | |
| | $d_7$ 4.50 | $N_4$ 1.7883 | $\nu_4$ 47.3 |
| $r_8$ −118.27 | | | |
| | *$d_8$ 10.87 to 3.41 to 0.80 to 3.45 to 11.82 | | |
| $r_9$ 115.00 | | | |
| | $d_9$ 3.50 | $N_5$ 1.6710 | $\nu_5$ 51.7 |
| $r_{10}$ 73.70 | | | |

TABLE 3

(Embodiment 3)
$f = 199.9$ to $176.8$  $\beta = -0.5$ to $-2.0$  FNo. $= 8.0$

| Radius of Curvature | Axial Distance | Refractive Index ($N_d$) | Abbe Number ($\nu$) |
|---|---|---|---|
| $r_1$ −217.64 | | | |
| | $d_1$ 4.50 | $N_1$ 1.5814 | $\nu_1$ 40.8 |
| $r_2$ −2157.78 | | | |
| | *$d_2$ 22.71 to 6.60 to 1.00 to 5.74 to 21.61 | | |
| $r_3$ 39.99 | | | |
| | $d_3$ 7.80 | $N_2$ 1.7200 | $\nu_2$ 52.1 |
| $r_4$ 97.34 | | | |
| | $d_4$ 1.90 | | |
| $r_5$ −178.65 | | | |
| | $d_5$ 4.00 | $N_3$ 1.5811 | $\nu_3$ 40.8 |
| $r_6$ 38.09 | | | |
| | *$d_6$ 4.33 to 4.83 to 5.00 to 4.91 to 4.60 | | |
| $r_7$ 77.28 | | | |
| | $d_7$ 7.00 | $N_4$ 1.7130 | $\nu_4$ 53.9 |
| $r_8$ −99.29 | | | |
| | *$d_8$ 18.73 to 7.80 to 4.00 to 7.26 to 18.14 | | |
| $r_9$ 145.75 | | | |
| | $d_9$ 4.50 | $N_5$ 1.5814 | $\nu_5$ 40.8 |

TABLE 3-continued (Embodiment 3)
f = 199.9 to 176.8   β = −0.5 to −2.0   FNo. = 8.0

| Radius of Curvature | Axial Distance | Refractive Index ($N_d$) | Abbe Number ($\nu$) |
|---|---|---|---|
| $r_{10}$ 82.25 | | | |

TABLE 4

(Embodiment 4)
f = 199.9 to 189.9   β = −1 to −0.64   FNo. = 8.0

| Radius of Curvature | Axial Distance | Refractive Index ($N_d$) | Abbe Number ($\nu$) |
|---|---|---|---|
| $r_1$ −123.00 | | | |
| | $d_1$ 4.5 | $N_1$ 1.6700 | $\nu_1$ 39.2 |
| $r_2$ −220.00 | | | |
| | *$d_2$ | 3.5 to 8.09 to 11.27 | |
| $r_3$ 42.32 | | | |
| | $d_3$ 11.3 | $N_2$ 1.6968 | $\nu_2$ 55.4 |
| $r_4$ 83.03 | | | |
| | $d_4$ 3.1 | | |
| $r_5$ −204.56 | | | |
| | $d_5$ 4.3 | $N_3$ 1.5955 | $\nu_3$ 39.2 |
| $r_6$ 39.03 | | | |
| | $d_6$ 3.9 | | |
| $r_7$ 67.50 | | | |
| | $d_7$ 4.6 | $N_4$ 1.7495 | $\nu_4$ 50.0 |
| $r_8$ −111.59 | | | |
| | *$d_8$ | 4.4 to 8.98 to 12.18 | |
| $r_9$ 220.00 | | | |
| | $d_9$ 4.5 | $N_5$ 1.6700 | $\nu_5$ 39.2 |
| $r_{10}$ 123.00 | | | |

TABLE 5

(Embodiment 5)
f = 199.9 to 190.0   β = −1 to −0.64   FNo. = 8.0

| Radius of Curvature | Axial Distance | Refractive Index ($N_d$) | Abbe Number ($\nu$) |
|---|---|---|---|
| $r_1$ −108.00 | | | |
| | $d_1$ 4.0 | $N_1$ 1.7170 | $\nu_1$ 47.9 |
| $r_2$ −239.60 | | | |
| | *$d_2$ | 1.0 to 3.54 to 5.31 | |
| $r_3$ 39.83 | | | |
| | $d_3$ 7.9 | $N_2$ 1.7545 | $\nu_2$ 51.6 |
| $r_4$ 109.20 | | | |
| | $d_4$ 2.2 | | |
| $r_5$ −540.76 | | | |
| | $d_5$ 3.0 | $N_3$ 1.6129 | $\nu_3$ 37.0 |
| $r_6$ 35.36 | | | |
| | $d_6$ 5.4 | | |
| $r_7$ 75.54 | | | |
| | $d_7$ 6.2 | $N_4$ 1.7725 | $\nu_4$ 49.8 |
| $r_8$ −120.02 | | | |
| | *$d_8$ | 5.2 to 7.74 to 9.50 | |
| $r_9$ 239.60 | | | |
| | $d_9$ 4.0 | $N_5$ 1.7170 | $\nu_5$ 47.9 |
| $r_{10}$ 108.00 | | | |

TABLE 6

(Embodiment 6)
f = 199.7 to 189.8   β = −1 to −0.64   FNo. = 8.0

| Radius of Curvature | Axial Distance | Refractive Index ($N_d$) | Abbe Number ($\nu$) |
|---|---|---|---|
| $r_1$ −103.00 | | | |
| | $d_1$ 5.0 | $N_1$ 1.6700 | $\nu_1$ 39.2 |
| $r_2$ −205.00 | | | |
| | *$d_2$ | 0.5 to 3.56 to 5.69 | |
| $r_3$ 44.00 | | | |
| | $d_3$ 8.5 | $N_2$ 1.7725 | $\nu_2$ 49.8 |
| $r_4$ 113.01 | | | |
| | $d_4$ 3.4 | | |
| $r_5$ −487.30 | | | |
| | $d_5$ 3.6 | $N_3$ 1.6259 | $\nu_3$ 35.7 |
| $r_6$ 38.74 | | | |
| | $d_6$ 5.6 | | |

TABLE 6-continued (Embodiment 6)
f = 199.7 to 189.8   β = −1 to −0.64   FNo. = 8.0

| Radius of Curvature | Axial Distance | Refractive Index ($N_d$) | Abbe Number ($\nu$) |
|---|---|---|---|
| $r_7$ 76.94 | | | |
| | $d_7$ 5.0 | $N_4$ 1.7650 | $\nu_4$ 46.3 |
| $r_8$ −123.46 | | | |
| | *$d_8$ | 5.8 to 8.86 to 10.98 | |
| $r_9$ 205.00 | | | |
| | $d_9$ 5.0 | $N_5$ 1.6700 | $\nu_5$ 39.2 |
| $r_{10}$ 103.00 | | | |

TABLE 7

(Embodiment 7)
f = 199.7 to 189.6   β = −1 to −0.64   FNo. = 8.0

| Radius of Curvature | Axial Distance | Refractive Index ($N_d$) | Abbe Number ($\nu$) |
|---|---|---|---|
| $r_1$ −147.80 | | | |
| | $d_1$ 4.5 | $N_1$ 1.6700 | $\nu_1$ 39.2 |
| $r_2$ −250.00 | | | |
| | *$d_2$ | 0.6 to 6.98 to 11.43 | |
| $r_3$ 41.25 | | | |
| | $d_3$ 10.6 | $N_2$ 1.7130 | $\nu_2$ 53.9 |
| $r_4$ 76.29 | | | |
| | $d_4$ 2.4 | | |
| $r_5$ −189.70 | | | |
| | $d_5$ 3.8 | $N_3$ 1.5955 | $\nu_3$ 39.2 |
| $r_6$ 40.69 | | | |
| | $d_6$ 4.1 | | |
| $r_7$ 78.81 | | | |
| | $d_7$ 9.7 | $N_4$ 1.7545 | $\nu_4$ 51.6 |
| $r_8$ −108.28 | | | |
| | *$d_8$ | 1.7 to 8.07 to 12.53 | |
| $r_9$ 250.00 | | | |
| | $d_9$ 4.5 | $N_5$ 1.6700 | $\nu_5$ 39.2 |
| $r_{10}$ 147.80 | | | |

TABLE 8

(Embodiment 8)
f = 200.0 to 190.0   β = −1 to −0.64   FNo. = 8.0

| Radius of Curvature | Axial Distance | Refractive Index ($N_d$) | Abbe Number ($\nu$) |
|---|---|---|---|
| $r_1$ −163.03 | | | |
| | $d_1$ 4.0 | $N_1$ 1.6700 | $\nu_1$ 39.2 |
| $r_2$ −420.33 | | | |
| | *$d_2$ | 2.0 to 5.41 to 8.13 | |
| $r_3$ 45.92 | | | |
| | $d_3$ 7.0 | $N_2$ 1.7725 | $\nu_2$ 49.8 |
| $r_4$ 149.64 | | | |
| | $d_4$ 5.0 | | |
| $r_5$ −225.90 | | | |
| | $d_5$ 3.2 | $N_3$ 1.6259 | $\nu_3$ 35.7 |
| $r_6$ 42.00 | | | |
| | $d_6$ 8.1 | | |
| $r_7$ 92.41 | | | |
| | $d_7$ 5.3 | $N_4$ 1.7883 | $\nu_4$ 47.3 |
| $r_8$ −125.33 | | | |
| | *$d_8$ | 5.2 to 8.82 to 11.07 | |
| $r_9$ 144.55 | | | |
| | $d_9$ 4.5 | $N_5$ 1.6700 | $\nu_5$ 39.2 |
| $r_{10}$ 83.98 | | | |

TABLE 9

(Embodiment 9)
f = 199.7 to 189.7   β = −1 to −0.64   FNo. = 8.0

| Radius of Curvature | Axial Distance | Refractive Index ($N_d$) | Abbe Number ($\nu$) |
|---|---|---|---|
| $r_1$ −177.50 | | | |
| | $d_1$ 4.0 | $N_1$ 1.5955 | $\nu_1$ 39.2 |
| $r_2$ −600.00 | | | |
| | *$d_2$ | 1.0 to 4.89 to 7.93 | |
| $r_3$ 48.58 | | | |
| | $d_3$ 10.0 | $N_2$ 1.7200 | $\nu_2$ 50.3 |

TABLE 9-continued (Embodiment 9)
f = 199.7 to 189.7  β = −1 to −0.64  FNo. = 8.0

| Radius of Curvature | Axial Distance | Refractive Index ($N_d$) | Abbe Number ($\nu$) |
|---|---|---|---|
| $r_4$ 149.55 | | | |
| | $d_4$ 4.6 | | |
| $r_5$ −168.57 | | | |
| | $d_5$ 3.8 | $N_3$ 1.5927 | $\nu_3$ 35.5 |
| $r_6$ 43.80 | | | |
| | $d_6$ 6.2 | | |
| $r_7$ 83.41 | | | |
| | $d_7$ 8.5 | $N_4$ 1.7650 | $\nu_4$ 46.3 |
| $r_8$ −118.12 | | | |
| | *$d_8$ | 3.0 to 7.10 to 9.67 | |
| $r_9$ 138.39 | | | |
| | $d_9$ 3.7 | $N_5$ 1.6129 | $\nu_5$ 37.0 |
| $r_{10}$ 83.15 | | | |

TABLE 10

| | Embodiment 1 | Embodiment 2 | Embodiment 3 |
|---|---|---|---|
| Focal length F | 198.9 | 201.0 | 199.9 |
| $F_2/F$ | 0.34 | 0.48 | 0.52 |
| $F_1/F_3$ | 1.28 | 1.0 | 1.25 |
| $R\|\beta\|>1/R\|\beta\|<1$ | 1.0 | 1.2 | 1.0 |
| $r_1/F_1$ | 0.55 | 0.67 | 0.52 |
| $\|r_{10}/F_3\|$ | 0.25 | 0.23 | 0.25 |
| $\frac{\Delta D_{3,4}}{\Delta D_{1,2}}$ ($\beta = -0.5$) | 0.019 | 0.020 | 0.031 |
| $\frac{\Delta D_{3,4}}{\Delta D_{2,3}}$ ($\beta = -0.5$) | 0.040 | 0.030 | 0.046 |
| $f_2/F_2$ | 0.83 | 0.9 | 0.86 |
| $(f_3 + f_4)/F_2$ | 0.11 | 0.06 | 0.08 |
| $d_3/F_2$ | 0.08 | 0.08 | 0.08 |
| $\sum_{2} d/F_2$ | 0.29 | 0.27 | 0.26 |

TABLE 11

| | Embodiment 4 | Embodiment 5 | Embodiment 6 | Embodiment 7 | Embodiment 8 | Embodiment 9 |
|---|---|---|---|---|---|---|
| Focal length F | 199.9 | 199.9 | 199.7 | 199.7 | 200.0 | 199.7 |
| $F_2/F$ | 0.55 | 0.45 | 0.48 | 0.61 | 0.56 | 0.53 |
| $F_1/F_3$ | 1.0 | 1.0 | 1.0 | 1.0 | 1.30 | 1.22 |
| $r_1/f_1$ | 0.29 | 0.39 | 0.33 | 0.27 | 0.41 | 0.42 |
| $\|r_{10}/F_3\|$ | 0.29 | 0.39 | 0.33 | 0.27 | 0.27 | 0.24 |
| $f_2/F_2$ | 1.00 | 0.89 | 0.92 | 0.92 | 0.82 | 0.91 |
| $(f_3 + f_4)/F_2$ | 0.02 | 0.08 | 0.06 | 0.05 | 0.12 | 0.06 |
| $d_3/F_2$ | 0.10 | 0.09 | 0.09 | 0.09 | 0.06 | 0.09 |
| $^2\Sigma d/F_2$ | 0.25 | 0.3 | 0.27 | 0.25 | 0.28 | 0.31 |

Obviously, many modifications and variations of the present invention are possible in light of the above teachings. It is therefore to be understood that within the scope of the appended claims, the invention may be practiced other than as specifically described.

What is claimed is:

1. A zoom lens system comprising, from a first side to a second side:

a first lens unit of a negative power including a negative lens element which is concave to the first side;

a second lens unit of a positive power including a positive meniscus lens element which is convex to the first side, a biconcave lens element with one surface having a larger radius of curvature than another surface of the biconcave lens element and a biconvex lens element; and a third lens unit of a negative power including a negative meniscus lens element which is concave to a second side, wherein, in order to perform zooming, the distance between the first lens unit and the second lens unit and the distance between the second lens unit and the third lens unit are varied, and the entire zoom lens system is moved along the optical axis.

2. A zoom lens system as claimed in claim 1, wherein the negative lens element of the first lens unit is a meniscus lens element.

3. A zoom lens system as claimed in claim 1, wherein the first lens unit and the third lens unit are moved substantially symmetrically to the second lens unit in order to perform zooming.

4. A zoom lens system as claimed in claim 1, wherein the distance between the biconcave lens element and the biconvex lens element of the second lens unit is varied in order to perform zooming.

5. A zoom lens system as claimed in claim 4, wherein a variation amount of the distance between the biconcave lens element and the biconvex lens element of the second lens unit is smaller than a variation amount of the distance between the first lens unit and the second lens unit and a variation amount of the distance between the second lens unit and the third lens unit.

6. A zoom lens system comprising, from a first side to a second side:

a first lens unit of a negative power including a negative lens element which is concave to the first side;

a second lens unit of a positive power including a positive meniscus lens element which is convex to the first side, a biconcave lens element with one surface having a larger radius of curvature than another surface of the biconcave lens element and a biconvex lens element, and where the distance between the biconcave lens element and the biconvex lens element is variable; and a third lens unit of a negative power including a negative meniscus lens element which is concave to the second side, wherein, in order to perform zooming, the distance between the first lens unit and the second lens unit, the distance between the second lens unit and the third lens unit, and the distance between the biconcave lens element and the biconvex lens element of the second lens unit are varied, and the entire zoom lens system is moved along the optical axis, wherein a variation amount of the distance between the biconcave lens element and the biconvex lens element of the second lens unit is smaller than a variation amount of the distance between the first lens unit and the second lens unit and a variation amount of the distance between the second lens unit and the third lens unit, and wherein the zoom lens system fulfills the following conditions:

$$0.4 < \frac{F_2}{F} < 0.65$$

$$0.9 < \frac{F_1}{F_3} < 1.4$$

where $F_1$ is a focal length of the first lens unit, $F_2$ is a focal length of the second lens unit, $F_3$ is a focal length of the third lens unit, and $F$ is a focal length of the entire zoom lens system at unity magnification.

7. A zoom lens system as claimed in claim 6, wherein the first lens unit and the third lens unit are moved asymmetrically to the second lens unit.

8. A zoom lens system as claimed in claim 7, wherein the following conditions are fulfilled:

$$0.9 \leq \frac{R|\beta| > 1}{R|\beta| < 1} < 1.3$$

$$0.2 < \frac{r_1}{F_1} < 0.8$$

$$0.1 < \left|\frac{r_{10}}{F_3}\right| < 0.5$$

$$\left|\frac{\Delta D_{3,4}}{\Delta D_{1,2}}\right|, \left|\frac{\Delta D_{3,4}}{\Delta D_{2,3}}\right| < 0.1$$

where $\Delta D_{1,2}$ is a variation amount of the distance between the first lens unit and the second lens unit, $\Delta D_{2,3}$ is a variation amount of the distance between the second lens unit and the third lens unit, $\Delta D_{3,4}$ is a variation amount of the distance between the biconcave lens element and the biconvex lens element of the second lens unit, $R|\beta|>1$ is a ratio of the $\Delta D_{2,3}$ to the $\Delta D_{1,2}$ at a magnification greater than unity, $R|\beta|<1$ is a ratio of the $\Delta D_{2,3}$ to the $\Delta D_{1,2}$ at a magnification less than unity, $r_1$ is a radius of curvature of the first side surface of the negative lens element of the first lens unit, and $r_{10}$ is a radius of curvature of the second side surface of the negative meniscus lens element of the third lens unit.

9. A zoom lens system as claimed in claim 8, wherein the following conditions are fulfilled:

$$0.7 < \frac{f_2}{F_2} < 1.2$$

$$0.01 < \frac{f_3 + f_4}{F_2} < 0.13$$

$$0.05 < \frac{d_3}{F_2} < 0.12$$

where $f_2$ is a focal length of the positive meniscus lens element of the second lens unit, $f_3$ is a focal length of the biconcave lens element of the second lens unit, $f_4$ is a focal length of the biconvex lens element of the second lens unit, and $d_3$ is an axial distance of the positive meniscus lens element of the second lens unit.

10. A zoom lens system comprising, from a first side to a second side:

a first lens unit of a negative power including a negative lens element which is concave to the first side;

a second lens unit of a positive power including a positive meniscus lens element which is convex to the first side, a biconcave lens element with a surface having a larger radius of curvature than another surface of the biconcave lens element and a biconvex lens element; and a third lens unit of a negative power including a negative meniscus lens element which is concave to the other side, wherein, in order to perform zooming, the distance between the first lens unit and the third lens unit are moved substantially symmetrically to the second lens unit, and the entire zoom lens system is moved along the optical axis, and wherein the zoom lens system fulfills the following conditions:

$$0.35 < \frac{F_2}{F} < 0.75$$

$$0.95 < \frac{F_1}{F_3} < 1.4$$

where $F_1$ is a focal length of the first lens unit, $F_2$ is a focal length of the second lens unit, $F_3$ is a focal length of the third lens unit, and $F$ is a focal length of the entire zoom lens system at unity magnification.

11. A zoom lens system as claimed in claim 10, wherein the following conditions are fulfilled:

$$0.2 < \frac{r_1}{F_1} < 0.7$$

$$0.15 < \left|\frac{r_{10}}{F_3}\right| < 0.5$$

where $r_1$ is a radius of curvature of the one side surface of the negative meniscus lens element of the first lens unit and $r_{10}$ is a radius of curvature of the second side surface of the negative meniscus lens element of the third lens unit.

12. A zoom lens system as claimed in claim 11, wherein the negative meniscus lens element of the first lens unit and the negative meniscus lens element of the third lens unit provide complementary compensation to aberrations.

13. A zoom lens system as claimed in claim 12, wherein the following conditions are fulfilled:

$$0.7 < \frac{f_2}{F_2} < 1.2$$

$$0.01 < \frac{f_3 + f_4}{F_2} < 0.13$$

$$0.05 < \frac{d_3}{F_2} < 0.12$$

where $f_2$ is a focal length of the positive meniscus lens element of the second lens unit, $f_3$ is a focal length of the biconcave lens element of the second lens unit, $f_4$ is a focal length of the biconvex lens element of the second lens unit, and $d_3$ is an axial thickness of the positive meniscus lens element of the second lens unit.

* * * * *